US012579396B2

(12) United States Patent
Byun et al.

(10) Patent No.: US 12,579,396 B2
(45) Date of Patent: Mar. 17, 2026

(54) METHOD AND APPARATUS FOR GENERATING PATTERN AND METHOD AND APPARATUS FOR DECODING PATTERN

(71) Applicant: SAMSUNG ELECTRONICS CO., LTD., Suwon-si (KR)

(72) Inventors: Junghyun Byun, Suwon-si (KR); Yeonghyeon Kim, Suwon-si (KR); Changmin Keum, Suwon-si (KR); Myungho Kim, Suwon-si (KR); Jungkweon Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/749,284

(22) Filed: Jun. 20, 2024

(65) Prior Publication Data

US 2024/0428035 A1 Dec. 26, 2024

(30) Foreign Application Priority Data

Jun. 23, 2023 (KR) ........................ 10-2023-0078857
Dec. 12, 2023 (KR) ........................ 10-2023-0180090

(51) Int. Cl.
*G06K 15/00* (2006.01)
*G06K 19/06* (2006.01)
(Continued)

(52) U.S. Cl.
CPC ...... *G06K 19/06037* (2013.01); *G06T 11/001* (2013.01); *G06T 11/206* (2013.01)

(58) Field of Classification Search
CPC .................... G06T 9/00; G06T 11/001; G06T 2207/10024; G06T 11/206; G06T 11/00;
(Continued)

(56) References Cited

U.S. PATENT DOCUMENTS 6,373,561 B2 4/2002 Riegel
8,090,194 B2 1/2012 Golrdon et al.
(Continued)

FOREIGN PATENT DOCUMENTS

CN 116029971 A 4/2023
JP 2013-200810 A 10/2013
(Continued)

OTHER PUBLICATIONS

Yang et al., "Color M-array shape reconstruction of using grid points and center points", Eleventh International Conference on Information Optics and Photonics (CIOP 2019), Proc. of SPIE, Dec. 20, 2019, 11 total pages, vol. 11209, doi:10.1117/12.2548591.
(Continued)

*Primary Examiner* — Daniel St Cyr
(74) *Attorney, Agent, or Firm* — Sughrue Mion, PLLC

(57) ABSTRACT

A method includes generating a pattern, and projecting the pattern. A plurality of elements are arranged in the pattern. The method further includes selecting a color for each of the plurality of elements from a color candidate group including a plurality of colors with equal differences between the plurality of colors. The color of each of the plurality of elements is different from a neighboring color of a neighboring element adjacent to that element. A plurality of color sequences corresponding to a plurality of sub-arrays are different from each other. The plurality of sub-arrays includes at least one element from among the plurality of elements. Distances between pairs of color sequences of the plurality of color sequences within the pattern are greater than or equal to a predetermined threshold.

18 Claims, 16 Drawing Sheets

(51) Int. Cl.
    *G06T 11/00*        (2006.01)
    *G06T 11/20*        (2006.01)

(58) Field of Classification Search
    CPC ........... G06K 19/06037; G06K 7/1417; G06K
                                   19/06046; G06K 1/123
    USPC .................................. 235/492, 462, 9, 462.1
    See application file for complete search history.

(56) References Cited

U.S. PATENT DOCUMENTS

| | | | |
|---|---|---|---|
| 8,508,671 | B2 | 8/2013 | Slack et al. |
| 10,147,214 | B2 | 12/2018 | Alon et al. |
| 10,284,831 | B2 | 5/2019 | Tanaka et al. |
| 11,109,006 | B2 | 8/2021 | Kaji |
| 11,245,883 | B2 | 2/2022 | Sodhi et al. |
| 11,423,273 | B2 | 8/2022 | Alon et al. |
| 11,468,673 | B2 | 10/2022 | Gupta et al. |
| 11,512,945 | B2 | 11/2022 | Shishido |
| 11,592,732 | B2 | 2/2023 | De La Cruz et al. |
| 11,936,830 | B2 | 3/2024 | Pia |
| 2006/0097036 | A1* | 5/2006 | Koenigsman .......... G06Q 40/00 |
| | | | 235/379 |
| 2006/0163357 | A1* | 7/2006 | Kim ..................... G06K 7/1417 |
| | | | 235/494 |
| 2009/0148037 | A1 | 6/2009 | Moriyama et al. |
| 2010/0033611 | A1 | 2/2010 | Lee et al. |
| 2012/0274775 | A1 | 11/2012 | Reiffel |
| 2014/0037146 | A1 | 2/2014 | Taguchi et al. |
| 2015/0116356 | A1 | 4/2015 | Alon et al. |
| 2016/0127734 | A1* | 5/2016 | Nurijanyan .......... H04N 19/174 |
| | | | 382/166 |
| 2018/0010907 | A1 | 1/2018 | Forster et al. |
| 2018/0315233 | A1* | 11/2018 | Foo ........................ H04N 19/44 |
| 2021/0103786 | A1* | 4/2021 | Yoshida ................ H04L 9/0861 |
| 2022/0180083 | A1* | 6/2022 | Whitesides ...... G06K 19/06037 |
| 2022/0417483 | A1 | 12/2022 | Kurokawa |

FOREIGN PATENT DOCUMENTS

| | | |
|---|---|---|
| KR | 10-2010-0018449 A | 2/2010 |
| KR | 10-2015-0022927 A | 3/2015 |
| KR | 10-2021-0034012 A | 3/2021 |

OTHER PUBLICATIONS

Petkovic et al., "Single-Shot Dense 3D Reconstruction Using Self-Equalizing De Bruijn Sequence", IEEE Transactions on Image Processing, Nov. 2016, pp. 5131-5144, vol. 25, doi:10.1109/TIP.2016.2603231.

Feng et al., "A Pattern and Calibration Method for Single-Pattern Structured Light System", IEEE Transactions on Instrumentation and Measurement, Jun. 2020, pp. 3037-3048, vol. 69, doi:10.1109/TIM.2019.2929281.

International Search Report issued Sep. 20, 2024 by the International Searching Authority in International patent Application No. PCT/KR2024/008163. (PCT/ISA/220, PCT/ISA/210 and PCT/ISA/237).

Communication issued Nov. 3, 2025 by the European Patent Office in European Patent Application No. 24732386.8.

* cited by examiner

FIG. 2

| | COLOR SEQUENCE / DISTANCE |
|---|---|
| SUB-ARRAY (151) | 431 516 262 |
| SUB-ARRAY (152) | 315 162 621 |
| CODE DEVIATION | 122 212 221 |
| Lee distance | 15 |

FIG. 3

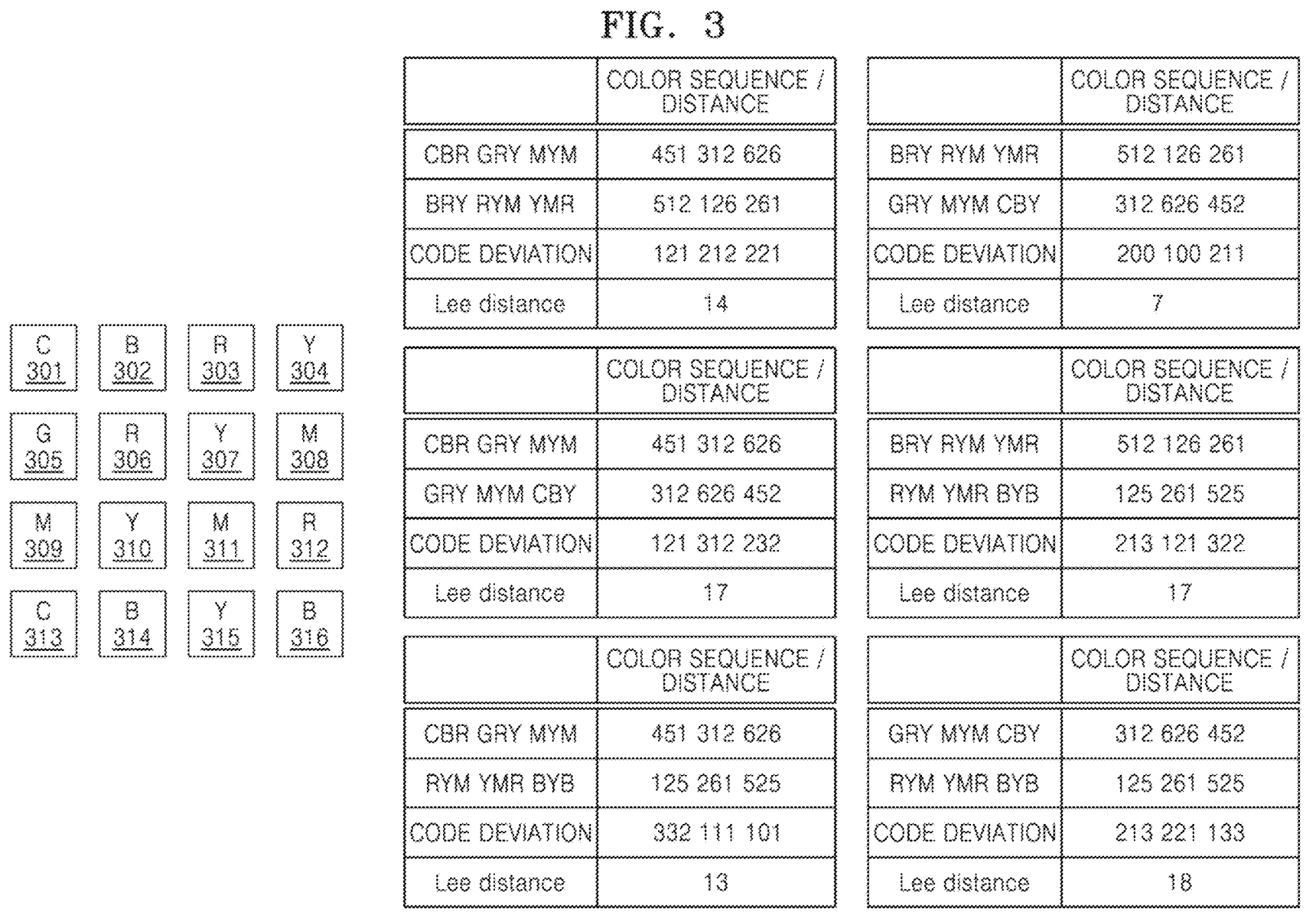

| | COLOR SEQUENCE / DISTANCE |
|---|---|
| CBR GRY MYM | 451 312 626 |
| BRY RYM YMR | 512 126 261 |
| CODE DEVIATION | 121 212 221 |
| Lee distance | 14 |

| | COLOR SEQUENCE / DISTANCE |
|---|---|
| CBR GRY MYM | 451 312 626 |
| GRY MYM CBY | 312 626 452 |
| CODE DEVIATION | 121 312 232 |
| Lee distance | 17 |

| | COLOR SEQUENCE / DISTANCE |
|---|---|
| CBR GRY MYM | 451 312 626 |
| RYM YMR BYB | 125 261 525 |
| CODE DEVIATION | 332 111 101 |
| Lee distance | 13 |

| | COLOR SEQUENCE / DISTANCE |
|---|---|
| BRY RYM YMR | 512 126 261 |
| GRY MYM CBY | 312 626 452 |
| CODE DEVIATION | 200 100 211 |
| Lee distance | 7 |

| | COLOR SEQUENCE / DISTANCE |
|---|---|
| BRY RYM YMR | 512 126 261 |
| RYM YMR BYB | 125 261 525 |
| CODE DEVIATION | 213 121 322 |
| Lee distance | 17 |

| | COLOR SEQUENCE / DISTANCE |
|---|---|
| GRY MYM CBY | 312 626 452 |
| RYM YMR BYB | 125 261 525 |
| CODE DEVIATION | 213 221 133 |
| Lee distance | 18 |

C 301   B 302   R 303   Y 304
G 305   R 306   Y 307   M 308
M 309   Y 310   M 311   R 312
C 313   B 314   Y 315   B 316

| | COLOR SEQUENCE / DISTANCE |
|---|---|
| BMB GRM RGY | 565 316 132 |
| GRM RGY MCG | 316 132 643 |
| CODE DEVIATION | 211 222 111 |
| Lee distance | 13 |

| | COLOR SEQUENCE / DISTANCE |
|---|---|
| MGR YRG GMC | 631 213 364 |
| GRM RGY MCG | 316 132 643 |
| CODE DEVIATION | 321 121 321 |
| Lee distance | 16 |

FIG. 9

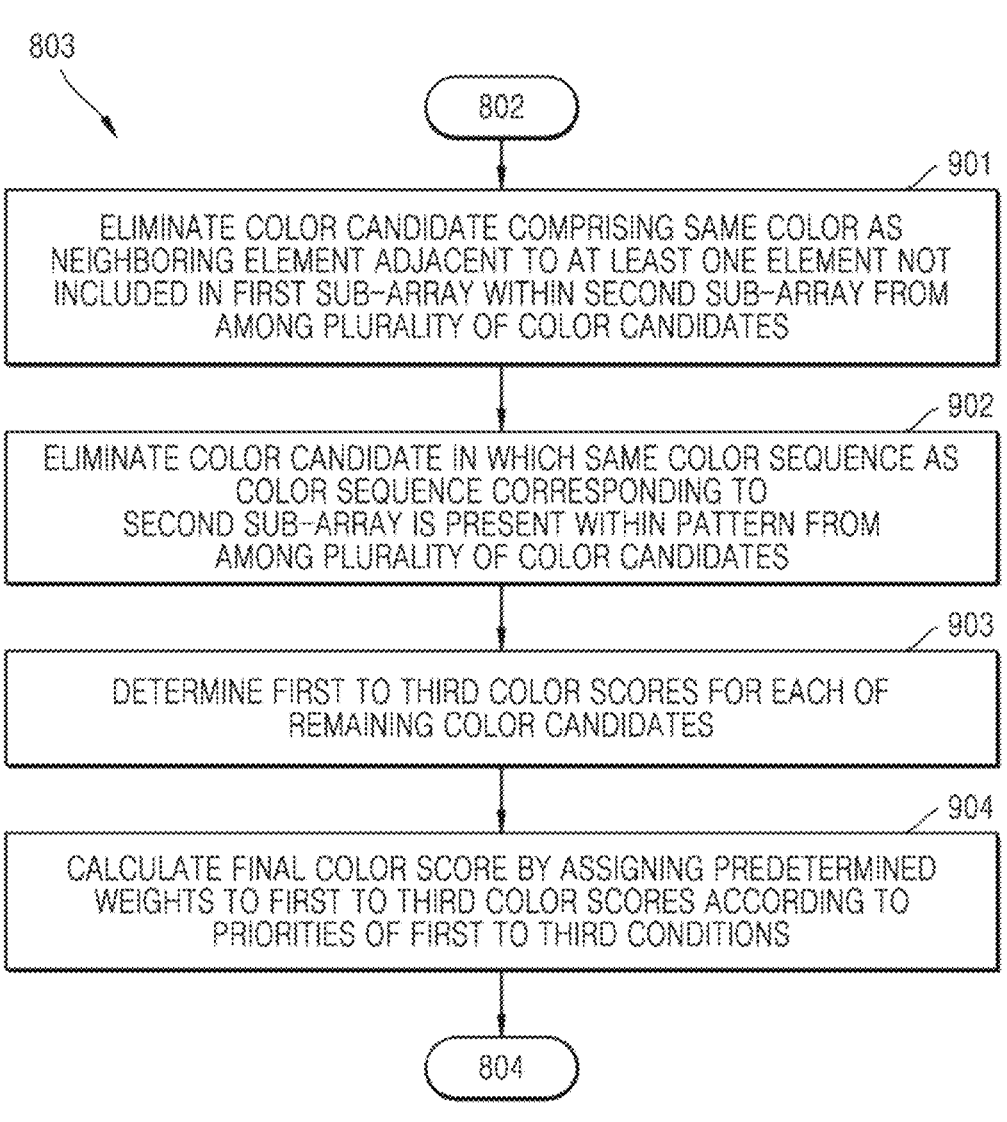

803

802

ELIMINATE COLOR CANDIDATE COMPRISING SAME COLOR AS
NEIGHBORING ELEMENT ADJACENT TO AT LEAST ONE ELEMENT NOT
INCLUDED IN FIRST SUB-ARRAY WITHIN SECOND SUB-ARRAY FROM
AMONG PLURALITY OF COLOR CANDIDATES
901

ELIMINATE COLOR CANDIDATE IN WHICH SAME COLOR SEQUENCE AS
COLOR SEQUENCE CORRESPONDING TO
SECOND SUB-ARRAY IS PRESENT WITHIN PATTERN FROM
AMONG PLURALITY OF COLOR CANDIDATES
902

DETERMINE FIRST TO THIRD COLOR SCORES FOR EACH OF
REMAINING COLOR CANDIDATES
903

CALCULATE FINAL COLOR SCORE BY ASSIGNING PREDETERMINED
WEIGHTS TO FIRST TO THIRD COLOR SCORES ACCORDING TO
PRIORITIES OF FIRST TO THIRD CONDITIONS
904

, (1,1): BRM YMY CGM
, (2,1): BRM YMY CGM | RMY MYR GMG 1
, (3,1): BRM YMY CGM | RMY MYR GMG 2
, (4,1): | RMY MYR GMG 3
, (1,2): BRM YMY CGM | YMY CGM YCY 1
, (2,2): BRM YMY CGM | RMY MYR GMG 4 | YMY CGM YCY 2 | MYR GMG CYC 1
, (3,2): BRM YMY CGM | RMY MYR GMG 5 | YMY CGM YCY 3 | MYR GMG CYC 2
, (4,2): | RMY MYR GMG 6 | MYR GMG CYC 3
, (1,3): BRM YMY CGM | YMY CGM YCY 4
, (2,3): BRM YMY CGM | RMY MYR GMG 7 | YMY CGM YCY 5 | MYR GMG CYC 4
, (3,3): BRM YMY CGM | RMY MYR GMG 8 | YMY CGM YCY 6 | MYR GMG CYC 5
, (4,3): | RMY MYR GMG 9 | MYR GMG CYC 6
, (4,4): | MYR GMG CYC 9

1000

| XY-COORDINATES | X: 1 | X: 2 | X: 3 | X: 4 |
|---|---|---|---|---|
| Y: 1 | Blue | Red | Magenta | Yellow |
| Y: 2 | Yellow | Magenta | Yellow | Red |
| Y: 3 | Cyan | Green | Magenta | Green |
| Y: 4 | Yellow | Cyan | Yellow | Cyan |

METHOD AND APPARATUS FOR GENERATING PATTERN AND METHOD AND APPARATUS FOR DECODING PATTERN

CROSS-REFERENCE TO RELATED APPLICATIONS

This application is a continuation application of International Application No. PCT/KR2024/008163, filed on Jun. 13, 2024, which claims priority to Korean Patent Application No. 10-2023-0078857, filed on Jun. 20, 2023, and Korean Patent Application No. 10-2023-0180090, filed on Dec. 12, 2023, in the Korean Intellectual Property Office, the disclosures of which are incorporated by reference herein in their entireties.

BACKGROUND

1. Field

The disclosure relates to a method and apparatus for generating a pattern and a method and apparatus for decoding a pattern.

2. Description of Related Art

A pattern may include a shape, an image, or a collection thereof created according to certain rules. Patterns may include a variety of information depending on the purpose. For example, structured light from a projector, fiducial markers (such as, but not limited to, quick response (QR) codes), or the like are some representative examples of patterns. Patterns may be used for various applications, such as, but not limited to, inspecting semiconductors or circuits for defects in factories, creating three-dimensional (3D) models of real-world objects by 3D scanners, creating and placing augmented reality (AR) objects by AR devices, capturing movements of an actor during filmmaking, or recognizing locations by mobile robots.

A generated pattern may be projected by a projector and/or used in printed form, and may be recognized and decoded by electronic devices including, for example, cameras and/or image sensors (e.g., charge-coupled devices (CCD), complementary metal-oxide-semiconductor (CMOS) devices, or the like).

Examples of pattern generation may include a method based on phase shifting and a method based on gray code. These methods may need a large number of shots because a plurality of patterns may need to be projected and/or photographed (e.g., captured) to expand the amount of information in a pattern along a temporal domain. Additionally or alternatively, these methods may only be effectively used in strictly controlled places (e.g., darkrooms, or the like) because the projected image may be vulnerable to a surrounding environment (e.g., ambient light, pattern or color of screen, or the like). Accordingly, these methods may not be suitable for use by non-expert users in everyday environments (e.g., a user's home environment).

Another example of a pattern generation may include a method of projecting a fiducial marker such as, but not limited to, a quick response (QR) code. In such a method, a black and white image with a high contrast ratio (CR) may be used for easy detection of fiducial markers, and a border where pixel intensity is inverted may also be used. However, because only black and white colors (e.g., two (2) bits) are used, the amount of information that may be included in a fiducial marker may be limited and/or insufficient, and as a result, when the number of pixels included in the fiducial marker is increased, the size of the fiducial marker may increase and/or resolution may decrease. In addition, because decoding of a pattern depends on border detection, a detection rate may be relatively low in situations where the boundary line is damaged, such as, but not limited to, defocus due to a camera lens or user's hand shaking, and/or low CR due to external illumination.

SUMMARY

According to an aspect of the present disclosure, a method includes generating a pattern, and projecting the pattern. A plurality of elements are arranged in the pattern. The method further includes selecting a color for each of the plurality of elements from a color candidate group including a plurality of colors with equal differences between the plurality of colors. The color of each of the plurality of elements is different from a neighboring color of a neighboring element adjacent to that element. A plurality of color sequences corresponding to a plurality of sub-arrays are different from each other. The plurality of sub-arrays includes at least one element from among the plurality of elements. Distances between pairs of color sequences of the plurality of color sequences within the pattern are greater than or equal to a predetermined threshold.

According to an aspect of the present disclosure, an electronic device includes a memory storing a program for generating and decoding a pattern in which a plurality of elements are arranged, at least one processor communicatively coupled with the memory, and a pattern projector configured to project the generated pattern. The program, when executed by the at least one processor, causes the electronic device to select a color for each of the plurality of elements from a color candidate group including a plurality of colors with equal differences between the plurality of colors, determine the color of each of the plurality of elements to be different from a neighboring color of a neighboring element adjacent to that element, determine the color of each of the plurality of elements such that a plurality of color sequences corresponding to a plurality of sub-arrays are different from each other, the plurality of sub-arrays including at least one element from among the plurality of elements. Distances between pairs of color sequences of the plurality of color sequences within the pattern are greater than or equal to a predetermined threshold.

According to an aspect of the present disclosure, a method of generating a pattern in which a plurality of elements are arranged, includes determining a color sequence corresponding to a first sub-array from among a plurality of sub-arrays, each sub-array of the plurality of sub-arrays including at least one element from among the plurality of elements, determining a plurality of color candidates to be assigned to at least one element not included in the first sub-array from among elements included in a second sub-array of the plurality of sub-arrays that is adjacent to the first sub-array, determining a color score of each of the plurality of color candidates according to a predetermined color sequencing condition, and determining a color candidate with a highest color score as a color of the at least one element not included in the first sub-array.

According to an aspect of the present disclosure, an electronic device includes a memory storing a program for generating a pattern in which a plurality of elements are arranged, and at least one processor communicatively coupled with the memory. The program, when executed by the at least one processor, causes the electronic device to determine a color sequence corresponding to a first sub-array from among a plurality of sub-arrays, each sub-array of the plurality of sub-arrays including at least one element from among the plurality of elements, determine a plurality of color candidates to be assigned to at least one element not included in the first sub-array from among elements included in a second sub-array of the plurality of sub-arrays that is adjacent to the first sub-array, determine a color score of each of the plurality of color candidates according to a predetermined color sequencing condition, and determine a color candidate with a highest color score as a color of the at least one element not included in the first sub-array.

According to an aspect of the present disclosure, a method of decoding a pattern in which a plurality of elements are arranged includes obtaining a pattern image by capturing the pattern, detecting peaks of pixel intensities from the pattern image, generating, by using the peaks of the pixel intensities, a graph including a plurality of vertices and isotropic edges coupling one vertex from among the plurality of vertices with vertices adjacent to a vertex of the plurality of vertices, searching whether a same graph as the generated graph is included by a plurality of original graphs respectively corresponding to a plurality of sub-arrays included in an original pattern, based on the same graph as the generated graph not being included by the plurality of original graphs, determining a distance between a color sequence corresponding to the generated graph and a plurality of original color sequences corresponding to the plurality of original graphs, and recognizing the color sequence corresponding to the generated graph as an original color sequence in which a distance from the color sequence corresponding to the generated graph is minimized from among original color sequences in which a distance from the color sequence corresponding to the generated graph is less than a predetermined threshold.

According to an aspect of the present disclosure, an electronic device includes a memory storing a program for decoding a pattern in which a plurality of elements are arranged, at least one processor communicatively coupled with the memory, and a pattern image sensor configured to obtain a pattern image by capturing the pattern. The program, when executed by the at least one processor, causes the electronic device to detect peaks of pixel intensities from the pattern image, generate, by using the peaks of the pixel intensities, a graph including a plurality of vertices and isotropic edges coupling one vertex from among the plurality of vertices with vertices adjacent to a vertex of the plurality of vertices, search whether a same graph as the generated graph is included by a plurality of original graphs respectively corresponding to a plurality of sub-arrays included in an original pattern, based on the same graph as the generated graph not being included by the plurality of original graphs, determine a distance between a color sequence corresponding to the generated graph and a plurality of original color sequences corresponding to the plurality of original graphs, and recognize the color sequence corresponding to the generated graph as an original color sequence in which a distance from the color sequence corresponding to the generated graph is minimized from among original color sequences in which a distance from the color sequence corresponding to the generated graph is less than a predetermined threshold.

According to an aspect of the present disclosure, a non-transitory computer readable recording medium storing one or more instructions that, when executed by the computer, cause the computer to perform a method may comprise generating a pattern, and projecting the pattern. A plurality of elements may be arranged in the pattern. The method may further include selecting a color for each of the plurality of elements from a color candidate group including a plurality of colors with equal differences between the plurality of colors. The color of each of the plurality of elements may be different from a neighboring color of a neighboring element adjacent to that element. A plurality of color sequences corresponding to a plurality of sub-arrays may be different from each other. The plurality of sub-arrays may include at least one element from among the plurality of elements. Distances between pairs of color sequences of the plurality of color sequences within the pattern may be greater than or equal to a predetermined threshold.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 2 describes a method of calculating a distance between color sequences, according to an embodiment;

FIG. 3 describes a first condition for determining a color sequence, according to an embodiment;

FIG. 9 is a flowchart of a method of calculating color scores of color candidates, according to an embodiment;

FIG. 10 describes duplicate sequence generation using a self-index code, according to an embodiment;

DETAILED DESCRIPTION

Figure 1:
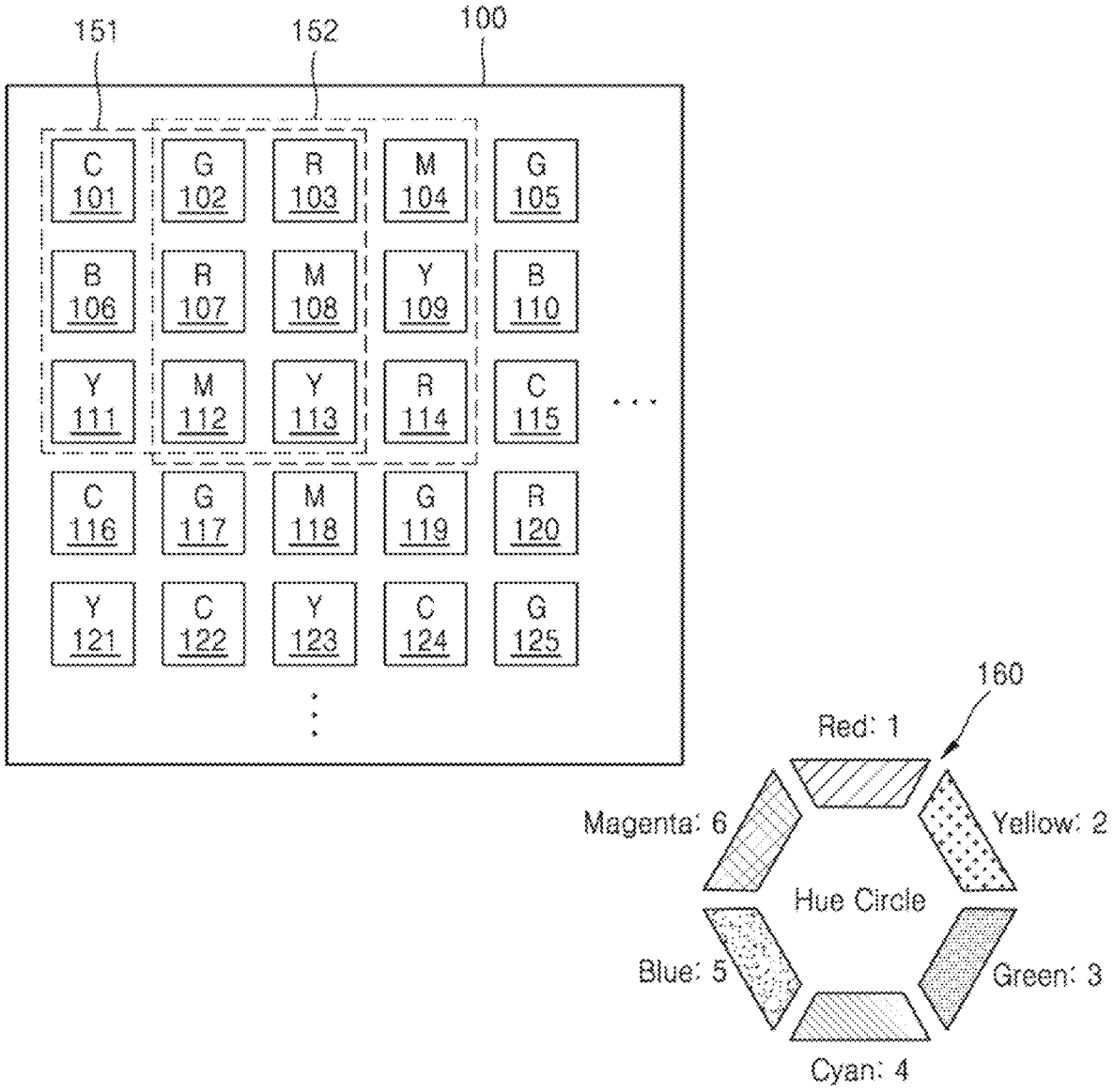
FIG. 1 shows a structure of a pattern, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. As used herein, the expression "at least one of a, b, or c" may denote "a", "b", "c", "a and b", "a and c", "b and c", or "all of a, b, and c."

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms are described in detail in the detailed description of the disclosure. Thus, the terms used herein have to be understood based on the meaning of the terms together with the description throughout the specification.

While such terms as "first", "second", or the like, may be used to describe various elements, such elements must not be limited to the above terms. The above terms are used only to distinguish one element from another element. For example, a first element may be named a second element without departing from the scope of the embodiment, and similarly, a second element may be named a first element.

When it is described that an element is "connected" or "coupled" to another element, it should be understood that the element may be directly connected or coupled to the other element, but that other elements may be present therebetween. On the other hand, when it is described that an element is "directly connected" or "directly coupled" to another element, it should be understood that no other elements are present therebetween.

Unless the context clearly dictates otherwise, the singular forms "a", "an", and "the" shall be understood to include a plurality of referents. Accordingly, for example, the expression "a component surface" may include reference to one or more of such surfaces.

An expression used in the singular may encompass the expression in the plural, unless it has a clearly different meaning in the context. Terms used herein, including technical or scientific terms, may have the same meaning as commonly understood by one of ordinary skill in the art described in the disclosure.

In the disclosure, the expression "comprise", "include", or "have" are intended to the presence of features, numbers, steps, operations, elements, parts, or combinations thereof described in the disclosure, but should be understood not to exclude in advance the presence or addition of one or more other features, numbers, steps, operations, elements, parts, or combinations thereof.

In the disclosure, in elements expressed as "-er/or (unit)" or "module", two or more elements may be combined into one element, or one element may be divided into two or more for more detailed functions. In addition, each of elements described below may further perform some or all of functions of other elements in addition to main functions that each element is responsible for, and some of the main functions that each element is responsible for may be performed in full charge by other elements.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

All functions or operations described in the disclosure may be processed by one processor or a combination of processors. The one processor or the combination of processors may include a circuitry that performs processing, including an application processor (AP), a communication processor (CP), a graphics processing unit (GPU), a neural processing unit (NPU), a microprocessor unit (MPU), a system on chip (SoC), an integrated chip (IC), or the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

In the disclosure, a machine-readable storage medium may be provided in a form of a non-transitory storage medium. Here, the "non-transitory storage medium" only denotes a tangible device and does not contain a signal (e.g., electromagnetic waves). This term does not distinguish a case where data is stored in the storage medium semi-permanently from a case where the data is stored in the storage medium temporarily. For example, the "non-transitory storage medium" may include a buffer where data is temporarily stored.

According to an embodiment, a method according to various embodiments described in the present disclosure may be provided by being included in a computer program product. The computer program products may refer to products that may be traded between sellers and buyers. The computer program product may be distributed in a form of machine-readable storage medium (e.g., a compact disc read-only memory (CD-ROM)), or distributed (e.g., downloaded or uploaded) through an application store or directly or online between two user devices (e.g., smartphones). In the case of online distribution, at least a part of the computer program product (e.g., a downloadable application) may be at least temporarily generated or temporarily stored in a machine-readable storage medium, such as a server of a manufacturer, a server of an application store, or a memory of a relay server.

Hereinbelow, with reference to the accompanying drawings, various embodiments of the present disclosure are described in detail so as to be easily implemented by a person skilled in the art to which the disclosure pertains. However, the present disclosure may be implemented in various different forms and is not limited to the embodiments described herein.

FIG. 1 shows a structure of a pattern 100, according to an embodiment.

As shown in FIG. 1, each of elements (e.g., a first element 101, a second element 102, a third element 103, a fourth element 104, a fifth element 105, a sixth element 106, a seventh element 107, an eighth element 108, a ninth element 109, a tenth element 110, an eleventh element 111, a twelfth element 112, a thirteenth element 113, a fourteenth element 114, a fifteenth element 115, a sixteenth element 116, a seventeenth element 117, an eighteenth element 118, a nineteenth element 119, a twentieth element 120, a twenty-first element 121, a twenty-second element 122, a twenty-third element 123, a twenty-fourth element 124, and a twenty-fifth element 125) included in the pattern 100 may be rectangles (e.g., have a rectangular shape). However, this is only an example, and the shapes of the first to twenty-fifth elements 101 to 125 are not limited to rectangles. For example, the shapes of the first to twenty-fifth elements 101 to 125 may be variously modified into a circle, triangle, pentagon, hexagon, or star shape, and may also be an abstract shape and/or another graphical form such as, but not limited to, a company logo.

A plurality of elements may be arranged in the pattern 100 according to an embodiment. Hereinbelow, an arrangement of a plurality of elements may be referred to as an array. In an embodiment, each of the first to twenty-fifth elements 101 to 125 of the array may have a color, and the color of each of the first to twenty-fifth elements 101 to 125 may be selected from a color candidate group including a plurality of colors with equal differences between colors. As used herein, the difference between colors may be a quantitative value that may be calculated by various color difference metrics such as Delta E, Delta E 2000, Delta E Color Measurement Committee (CMC), International Commission on Illumination 94 (CIE94), CIEDE2000, or DIN99. The pattern 100 may include a plurality of pixels. For example, each of the first to twenty-fifth elements 101 to 125 of the pattern 100 may be visually distinguished according to pixel intensities of the plurality of pixels.

In an embodiment, the color candidate group may be at least one of black and white (BW), red, green, and blue (RGB), cyan, magenta, and yellow (CMY), or red, yellow, green, cyan, blue, magenta (RYGCBM). However, the present disclosure is not limited thereto. For example, the color candidate group may be determined from various color spaces such as hue, saturation, brightness/value (HSB or HSV), hue, saturation, lightness (HSL), lightness, red/green value, and blue/yellow value (LAB), or XYZ (CIE 1931). Hereinbelow, for convenience of description, it may be assumed that the color candidate group is RYGCBM.

In an embodiment, a hue circle may be formed by arranging colors belonging to a color candidate group so that complementary colors face each other, and each color may correspond to a numeric code. For example, as shown in FIG. 1, in the case of the color group RYGCBM, a hue circle 160 may be formed so that red R and cyan C are facing each other, yellow Y and blue B are facing each other, and green G and magenta M are facing each other, and in this case, red R, yellow Y, green G, cyan C, blue B, and magenta M may correspond to numeric codes 1, 2, 3, 4, 5, and 6, respectively. Hereinbelow, each color and a numeric code corresponding to each color are used with the same meaning.

In an embodiment, a color of each of the first to twenty-fifth elements 101 to 125 may be determined to be different from a color of a neighboring color. Here, the neighboring element may include an adjacent element, for example, elements above, below, left, and right of a reference element. In the example of FIG. 1, neighboring elements of the seventh element 107 may include the second element 102, the sixth element 106, the eighth element 108, and the twelfth element 112, and neighboring elements of the nineteenth element 119 may include the fourteenth element 114, the eighteenth element 118, the twentieth element 120, and the twenty-fourth element 124. As shown in FIG. 1, a color of the seventh element 107 may be determined as red R, which may be different from the colors of the neighboring elements (e.g., the second element 102, the sixth element 106, the eighth element 108, and the twelfth element 112), which may be green G, blue B, and magenta M, and a color of the nineteenth element 119 may be determined as green G, which may be different from the colors of the neighboring elements (e.g., the fourteenth element 114, the eighteenth element 118, the twentieth element 120, and the twenty-fourth element 124), which may be red R, magenta M, and cyan C.

In an embodiment, the color of each of the first to twenty-fifth elements 101 to 125 may be determined so that a plurality of color sequences corresponding to a plurality of sub-arrays including at least one of a plurality of elements are different from each other. For example, a sub-array may be a one-dimensional (1D) array such as, but not limited to, a de Bruijn sequence, and/or may be a two-dimensional (2D) array of an m×n size, where m and n are positive integers greater than zero (0). In an embodiment, for a 2D array, m and n may be the same number, for example, m and n may be equal to three (3) (e.g., m=n=3).

In an embodiment, the sub-arrays may overlap each other. For example, some of elements included in one sub-array may also be included in another sub-array. In the example of FIG. 1, a first sub-array 151 and a second sub-array 152 may be 2D arrays of a 3×3 size, the first sub-array 151 may include the first element 101, the second element 102, the third element 103, the sixth element 106, the seventh element 107, the eighth element 108, the eleventh element 111, the twelfth element 112, and the thirteenth element 113, and the second sub-array 152 may include the second element 102, the third element 103, the fourth element 104, the seventh element 107, the eighth element 108, the ninth element 109, the twelfth element 112, the thirteenth element 113, and the fourteenth element 114.

In an embodiment, a color sequence may be and/or may include a list of colors included in a sub-array. For example, a color sequence of the first sub-array 151 may be CGR BRM YMY, and a color sequence of the second sub-array 152 may be GRM, RMY MYR. When the color sequence is expressed as a color code, the color sequence of the first sub-array 151 may be 431 516 262, and the color sequence of the second sub-array 152 may be 315 162 621.

Because the color of each of the first to twenty-fifth elements 101 to 125 is different from a color of a neighboring element and a color sequence corresponding to each sub-array is uniquely determined within the pattern 100, the pattern 100 according to an embodiment may include a relatively large amount of information with just one pattern and may be decoded with just one pattern image captured by a camera.

In an embodiment, a color of a background portion of the pattern 100 excluding the first to twenty-fifth elements 101 to 125 may be determined as a single color that may not be included in the color candidate group. For example, when the color candidate group is RYGCBM, the color of the background portion may be determined as black. In a state in which the color of the background portion is a single color, when the camera photographs (e.g., captures) a pattern, even when all or part of a pattern image is modulated due to a color of a surface on which the pattern is projected and the influence of external lighting, a portion of the pattern image where the most modulation occurred may be identified.

FIG. 2 describes a method of calculating a distance between color sequences, according to an embodiment.

In related environments such as, but not limited to, a user's home environment, defocus may occur due to the characteristics of a camera lens and/or the user's hand shaking, and/or a low contrast ratio situation may occur due to external illumination. In pattern images obtained in defocus or low contrast ratio situations, a color and/or shape of the pattern may be modulated. In addition, when a pattern is projected onto an uneven surface (e.g., a vertex where two walls and a ceiling meet) and the projected pattern is photographed with a camera, a pattern image with a completely different shape from an original pattern may be obtained, and chromatic aberration may occur due to a depth of field of a camera lens, and thus, a color of a pattern shown in the pattern image may be modulated.

In order for non-expert users to use a pattern in related environments, the color of each of the first to twenty-fifth elements 101 to 125 of the pattern 100, according to an embodiment, may be determined to satisfy additional conditions. Hereinbelow, a method of calculating a distance between color sequences is described, and additional conditions for determining the color of each of the first to twenty-fifth elements 101 to 125 are described. Because a color sequence is a list of colors included in a sub-array, determining a color sequence described below may be understood as having the same meaning as determining a color of each element in a sub-array corresponding to the color sequence.

As described with reference to FIG. 1, a hue circle may be formed by arranging colors belonging to a color candidate group so that complementary colors face each other, and each color may correspond to a numeric code. Based on the numeric code, a color sequence corresponding to each sub-array may correspond to a sequence of numeric codes. Accordingly, a distance between color sequences may be calculated by using the sequence of numeric codes.

The distance between color sequences may be calculated by using various distance metrics such as, but not limited to, Lee distance, hamming distance, Levenshtein distance, edit distance, Jaro distance, or Damerau-Levenshtein distance. In the present disclosure, a method of calculating a distance between color sequences by using Lee distance is described as an example. For two color sequences $x_1 x_2 \ldots xn$ and $y_1 y_2 \ldots y_n$, Lee distance may be calculated by an equation similar to Equation 1.

$$\sum_{i=1}^{n} \min(|x_i - y_i|, c - |x_i - y_i|) \qquad \text{[Equation 1]}$$

Referring to Equation 1, c may represent the number of colors in a color candidate group. For example, when the color candidate group is RGB, c may be equal to three (3) (e.g., c=3). As another example, when the color candidate group is RYGCBM, c may be equal to six (6) (e.g., c=6).

Referring to FIGS. 1 and 2, the color sequence of the first sub-array 151 may be 431 516 262, and the color sequence of the second sub-array 152 may be 315 162 621. When the first sub-array 151 and the second sub-array 152 are applied to Equation 1, a deviation of each numeric code between the color sequence of the first sub-array 151 and the color sequence of the second sub-array 152 (e.g., $\min(|x_i - y_i|$, $c - |x_i - y_i|)$) may be 122 212 221, and the sum of the deviations, that is, Lee distance, may be equal to fifteen (15). When other distance metrics described above are used in addition to Lee distance, the distance between two color sequences may vary.

FIG. 3 describes a first condition for determining a color sequence, according to an embodiment.

In an embodiment, a color sequence may be determined so that distances between all pairs of color sequences within the pattern 100 are greater than or equal to a predetermined threshold. The predetermined threshold may be heuristically and/or experimentally set by considering various factors such as a size of an entire array, a size of a sub-array (e.g., a length of a color sequence), the number of colors in a color candidate group, or a target recognition rate of the pattern. When the predetermined threshold is too large, the number of usable color sequences may decrease, and when the threshold is too small, a pattern recognition rate may decrease. For example, when the size of the entire array is 36×64, the size of the sub-array is 3×3, and the number of colors in the color candidate group is six (6) (e.g., RYGCBM), the threshold may be set to four (4). The distance between color sequences may be calculated by using any of the various distance metrics described above.

In the example of FIG. 3, when a sub-array of a 3×3 size is considered, a color sequence of a first sub-array including a first element 301, a second element 302, a third element 303, a fifth element 305, a sixth element 306, a seventh element 307, a ninth element 309, a tenth element 310, and an eleventh element 311 may be 451 312 626, and a color sequence of a second sub-array including the second element 302, the third element 303, a fourth element 304, the sixth element 306, the seventh element 307, an eighth element 308, a tenth element 310, the eleventh element 311, and a twelfth element 312 may be 512 126 261. A deviation of each numeric code between the two color sequences of the first sub-array and the second sub-array may be 122 212 221, and the Lee distance may be 14.

In a similar way, distances between all remaining pairs of color sequences that may be considered in the example of FIG. 3 are described below.

A distance between the color sequence (e.g., 451 312 626) of the first sub-array including the first element 301, the second element 302, the third element 303, the fifth element 305, the sixth element 306, the seventh element 307, the ninth element 309, the tenth element 310, and the eleventh element 311 and a color sequence (e.g., 312 626 454) of a third sub-array including the fifth element 305, the sixth element 306, the seventh element 307, the ninth element 309, the tenth element 310, the eleventh element 311, a thirteenth element 313, a fourteenth element 314, and fifteenth element 315 may be 17.

A distance between the color sequence (e.g., 451 312 626) of the first sub-array including the first element 301, the second element 302, the third element 303, the fifth element 305, the sixth element 306, the seventh element 307, the ninth element 309, the tenth element 310, and the eleventh element 311 and a color sequence (e.g., 125 261 525) of a fourth sub-array including the sixth element 306, the seventh element 307, the eighth element 308, the tenth element 310, the eleventh element 311, the twelfth element 312, the fourteenth element 314, the fifteenth element 315, and the sixteenth element 316 may be 13.

A distance between a color sequence (e.g., 512 126 261) of the second sub-array including the second element 302, the third element 303, a fourth element 304, the sixth element 306, the seventh element 307, an eighth element 308, a tenth element 310, the eleventh element 311, and a twelfth element 312 and the color sequence (e.g., 312 626 454) of the third sub-array including the fifth element 305, the sixth element 306, the seventh element 307, the ninth element 309, the tenth element 310, the eleventh element 311, a thirteenth element 313, a fourteenth element 314, and fifteenth element 315 may be 7.

A distance between the color sequence (e.g., 512 126 261) of the second sub-array including the second element 302, the third element 303, a fourth element 304, the sixth element 306, the seventh element 307, an eighth element 308, a tenth element 310, the eleventh element 311, and a twelfth element 312 and the color sequence (e.g., 125 261 525) of the fourth sub-array including the sixth element 306, the seventh element 307, the eighth element 308, the tenth element 310, the eleventh element 311, the twelfth element 312, the fourteenth element 314, the fifteenth element 315, and the sixteenth element 316 may be 17.

A distance between a color sequence (e.g., 312 626 452) of the third sub-array including the fifth element 305, the sixth element 306, the seventh element 307, the ninth element 309, the tenth element 310, the eleventh element 311, a thirteenth element 313, a fourteenth element 314, and fifteenth element 315 and the color sequence (e.g., 125 261 525) of the fourth sub-array including the sixth element 306, the seventh element 307, the eighth element 308, the tenth element 310, the eleventh element 311, the twelfth element 312, the fourteenth element 314, the fifteenth element 315, and the sixteenth element 316 may be 18.

When the threshold is set to four (4), the example of FIG. 3 satisfies the first condition because the distance between all color sequence pairs is greater than or equal to four (4).

Figure 4:
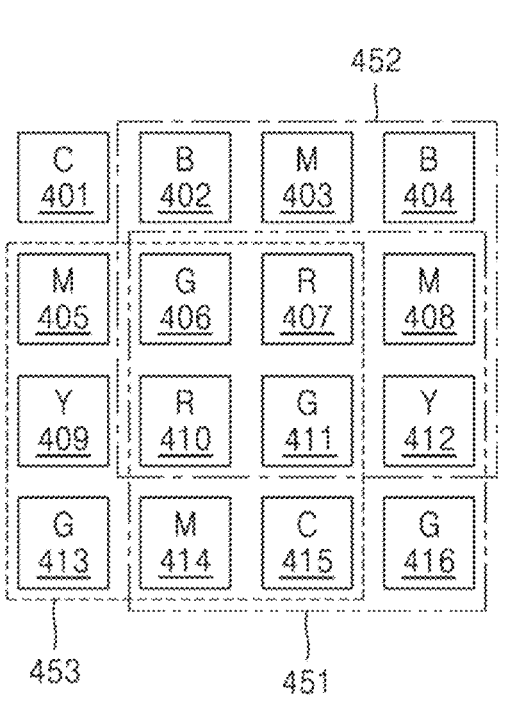
FIG. 4 describes a second condition for determining a color sequence, according to an embodiment.

FIG. 4 describes a second condition for determining a color sequence, according to an embodiment.

In an embodiment, the color sequence may be determined so that a distance from at least one adjacent color sequence is minimized. Adjacent sub-arrays may share some elements and/or may not share some elements. For example, when the size of a sub-array is 3×3, adjacent sub-arrays may share six (6) elements and may not share three (3) elements. When a color sequence is determined such that a difference between colors not shared by two (2) adjacent sub-arrays is minimized, a change in color number code between patterns is continuous, and thus, even when an error occurs when decoding a pattern, an error distance may be minimized. For example, the color sequence may be determined by considering a distance from an upper color sequence and a distance from a left color sequence within the pattern. When two (2) or more adjacent color sequences are considered, a target color sequence may be determined so that an average of distances from each adjacent color sequence is minimized.

In the example of FIG. 4, when a sub-array of a 3×3 size is considered, sub-arrays adjacent to a first sub-array 451 including a sixth element 406, a seventh element 407, an eighth element 408, a tenth element 410, an eleventh element 411, a twelfth element 412, a fourteenth element 414, a fifteenth element 415, and a sixteenth element 416 may include an upper sub-array 452 including a second element 402, a third element 403, a fourth element 404, the sixth element 406, the seventh element 407, the eighth element 408, the tenth element 410, the eleventh element 411, and the twelfth element 412 and a left sub-array 453 including a fifth element 405, the sixth element 406, the seventh element 407, a ninth element 409, the tenth element 410, the eleventh element 411, a thirteenth element 413, the fourteenth element 414, and the fifteenth element 415. A distance between the color sequence of the first sub-array 451 (e.g., 316 132 643) and the color sequence (e.g., 565 316 132) of the upper sub-array 452 may be 13, and a distance between the color sequence of the first sub-array 451 (e.g., 316 132 643) and the color sequence (e.g., 631 213 364) of the left sub-array 453 may be 16.

In a similar manner, a color sequence of the entire pattern may be determined by determining the color sequence of the remaining sub-arrays such that a distance from a color sequence of at least one adjacent sub-array from left to right and from top to bottom may be minimized.

Figure 5:
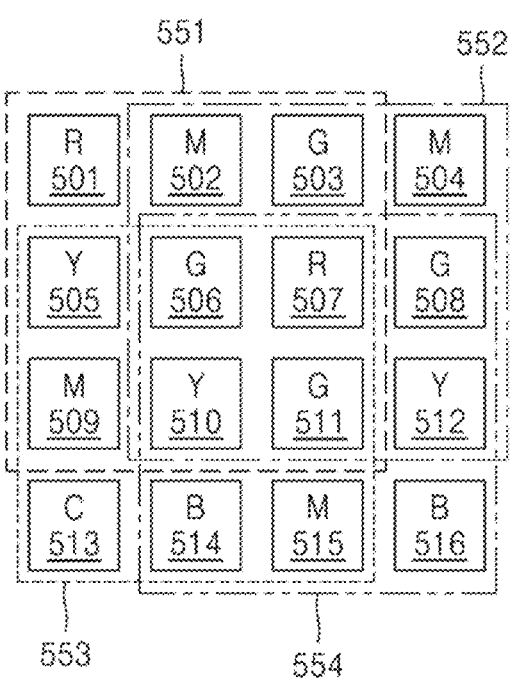
FIG. 5 describes a third condition for determining a color sequence, according to an embodiment.

FIG. 5 describes a third condition for determining a color sequence, according to an embodiment.

In an embodiment, the color sequence may be determined so that colors of the same color category are spaced apart from each other as much as possible. Here, the color category may include a reference color and colors adjacent to the reference color on a hue circle in which colors included in a color candidate group are arranged so that complementary colors face each other. Each color may fall into two (2) or more color categories. For example, when the color candidate group is RYGCBM and the reference color is RGB, three color categories (e.g., a color category corresponding to red R, a color category corresponding to green G, and a color category corresponding to blue B) may be considered. In this case, the color category corresponding to red R may include magenta, red, and yellow, the color category corresponding to green G may include yellow, green, and cyan, and the color category corresponding to blue B may include cyan, blue, and magenta. Alternatively, when the color candidate group is RYGCBM and the reference color is CMY, a color category corresponding to cyan C, a color category corresponding to magenta M, and a color category corresponding to yellow Y may be considered. In this case, the color category corresponding to cyan C may include green, cyan, and blue, the color category corresponding to magenta M may include blue, magenta, and red, and the color category corresponding to yellow Y may include red, yellow, and green.

To implement the third condition, in an embodiment, the color sequence may be determined to include at least one color from each color category. For example, when a sub-array of a 3×3 size is considered, the color sequence may include nine (9) colors. In such an example, when the color categories are divided into RGB, each color sequence may be determined to include at least one color belonging to the red R category, at least one color belonging to the green G category, and at least one color belonging to the blue B category.

In an embodiment, the color sequence may be determined so that ratios of the color categories are as uniform as possible. For example, the color sequence may be determined so that all of the color included in the color category corresponding to red R, the color included in the color category corresponding to green G, and the color included in the color category corresponding to blue B have the same ratio, and even when the ratios of the color categories are not exactly the same, the color sequence may be determined not to be biased toward a single color range (e.g., R:G:B=2:3:4 rather than R:G:B=1:1:7).

As shown in FIG. 5, a color sequence of a first sub-array 551 including a first element 501, a second element 502, a third element 503, a fifth element 505, a sixth element 506, a seventh element 507, a ninth element 509, a tenth element 510, and an eleventh element 511 may be RMG YGR MYG, and when counting including duplicates, colors included in the color category corresponding to red R (e.g., two (2) red, two (2) yellow, and two (2) magenta), colors included in the color category corresponding to yellow Y (e.g., two (2) yellow and two (2) green), and colors included in a color category corresponding to blue B (e.g., two (2) magenta) may all be included.

Similarly, a color sequence of a second sub-array 552 including the second element 502, the third element 503, a fourth element 504, the sixth element 506, the seventh element 507, an eighth element 508, the tenth element 510, the eleventh element 511, and a twelfth element 512 are MGM GRG YGY, and colors included in the color category corresponding to red R (e.g., one (1) red, two (2) yellow, and two (2) magenta), colors included in the color category corresponding to green G (e.g., two (2) yellow and four (4) green), and colors included in the color category corresponding to blue B (e.g., two (2) magenta) may all be included.

A color sequence of a third sub-array 553 including the fifth element 505, the sixth element 506, the seventh element 507, the ninth element 509, the tenth element 510, the eleventh element 511, a thirteenth element 513, the fourteenth element 514, and the fifteenth element 515 are YGR MYG CBM, and colors included in the color category corresponding to red R (e.g., one (1) red, two (2) yellow, and two (2) magenta), colors included in the color category corresponding to green G (e.g., two (2) yellow, two (2) green, and one (1) cyan), and colors included in the color category corresponding to blue B (e.g., one (1) cyan, one (1) blue, and two (2) magenta) may all be included.

A color sequence of a fourth sub-array 554 including the sixth element 506, the seventh element 507, the eighth element 508, the tenth element 510, the eleventh element 511, the twelfth element 512, the fourteenth element 514, the fifteenth element 515, and a sixteenth element 516 are GRG YGY BMB, and colors included in the color category corresponding to red R (e.g., one (1) red, two (2) yellow, and one (1) magenta), colors included in the color category corresponding to green G (e.g., two (2) yellow and three (3) green), and colors included in the color category corresponding to blue B (e.g., two (2) blue and one (1) magenta) may all be included.

The third condition may be to space colors included in the same color category as far apart as possible to ensure equal distribution of colors throughout the pattern. When a pattern is projected onto a patterned (e.g., striped) or multi-colored surface and photographed with a camera, in a case in which there is a local portion of the pattern including only colors from one color category, that portion may be affected by a surface color and recognized by the camera as a different color. For example, when a pattern is projected onto a red surface, in a case in which the pattern includes a portion including only colors from the color category corresponding to blue, that portion may be mistakenly recognized as black. When colors are evenly distributed throughout the pattern, color misrecognition may be minimized. When the pattern is projected onto a surface with a pattern or a mixture of colors, the projected pattern may be photographed and decoded to identify color distribution information of the surface, and based on the color distribution information, color may be corrected when an image or a video is projected on the surface.

The color sequence determination conditions described above with reference to FIGS. 3 to 5 are not mutually exclusive and may be applied simultaneously. In other words, the color of each of the first to twenty-fifth elements 101 to 125 of the pattern 100 may be determined to satisfy one of the first to third conditions, two of the first to third conditions, or all of the first to third conditions. When the color sequence is determined to satisfy two or more conditions, a priority of each condition may be set differently. For example, the color sequence may be determined by setting the priority of the first condition to be higher than the priorities of the second and third conditions. However, the present disclosure is not limited in this regard, and the priorities of the conditions may be set differently.

Figure 6:
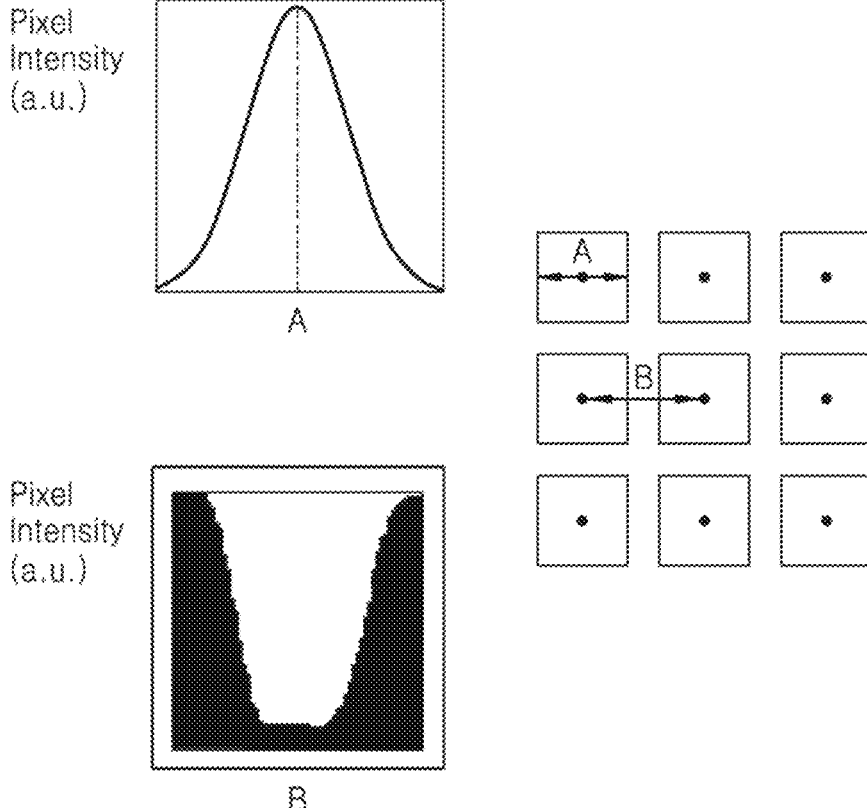
FIG. 6 describes a pixel intensity distribution of a pattern, according to an embodiment.

FIG. 6 describes a pixel intensity distribution of the pattern 100 according to an embodiment.

When defocus occurs when a pattern is photographed with a camera, a shape of the pattern may be modulated in the pattern image, which may lower a pattern recognition rate when decoding. For example, when defocus occurs when a fiducial marker such as a QR code is recognized, a black and white border may be blurred, making it difficult to detect a grid necessary for decoding, and there is a relatively high probability that recognition of the entire marker may fail. The pattern 100, according to an embodiment, may include information that is robust to defocus so that the pattern 100 may be well decoded even in a defocus situation.

In an embodiment, the pixel intensity of each of the first to twenty-fifth elements 101 to 125 of the pattern 100 may follow a predetermined distribution having a peak at the center of each element. For example, the predetermined distribution may include a bell-shaped probability distribution such as Gaussian distribution, Cauchy distribution, Laplace distribution, or Student's t distribution, and may include a cosine distribution.

FIG. 6 shows a distribution of pixel intensity in a case in which the pixel intensity of each element follows the Gaussian distribution. In FIG. 6, only a distribution of pixel intensity in the horizontal direction is shown. However, it should be noted that the same may be applied to the vertical or diagonal directions. As shown in FIG. 6, it may be seen that a pixel intensity within an element (e.g., section A in FIG. 6) has a peak at the center and decreases toward the edges. In addition, when the pixel intensity of each element follows the Gaussian distribution, the pixel intensity between the centers of two adjacent elements (e.g., section B in FIG. 6) may follow a distribution similar to a cosine wave in which the Gaussian distribution is inverted. As described below, a distribution of pixel intensity within each element and a distribution of pixel intensity between two adjacent elements may be used when a pattern is decoded.

In an embodiment, blurring of a captured image due to defocus may be approximated as Gaussian blur. In order for a pattern to be well recognized even when defocus occurs, it may be necessary that the pattern includes information that is maintained (or less damaged) even when Gaussian blur is applied. An example of such information is the Gaussian distribution. When the pixel intensity follows the Gaussian distribution, even when Gaussian blur is applied, the pixel intensity itself may decrease throughout the pattern, but the distribution of pixel intensity may be maintained. The pattern 100, according to an embodiment, may be designed so that the pixel intensity follows the predetermined distributions described above, thereby potentially achieving a relatively high pattern recognition rate even under a defocus environment.

Figure 7:
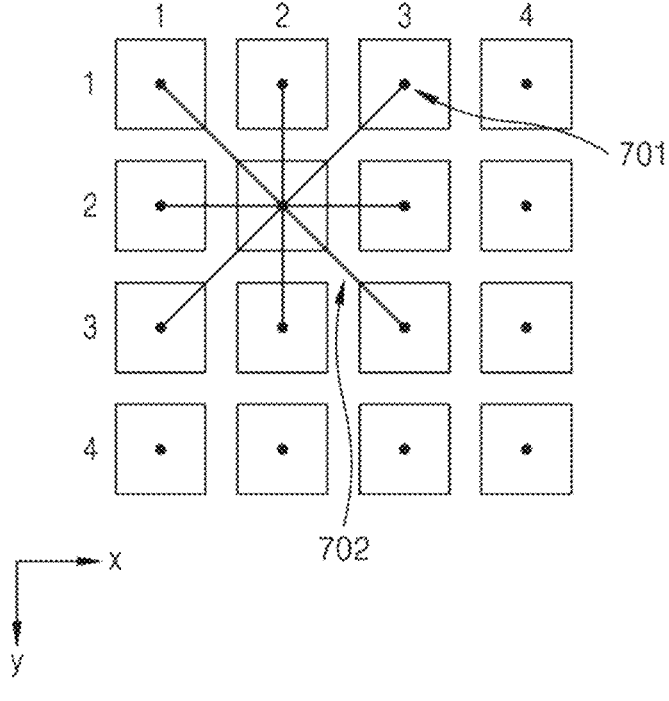
FIG. 7 describes graph information of a pattern, according to an embodiment.

FIG. 7 describes graph information of the pattern 100, according to an embodiment.

In an embodiment, the pattern 100 may include a graph in which each element is a vertex (or node) 701 and a connection between adjacent elements is an edge 702. The vertex 701 of the graph may include color information of a center (e.g., peak) of each element, and the edge 702 may include distribution information of pixel intensity between the centers (e.g., between peaks) of adjacent elements. In such an embodiment, the number of vertices of each graph may be set equal to a size of a sub-array. Accordingly, the sub-array may correspond to the graph.

For example, as shown in FIG. 7, the pattern may include a graph having an element positioned at (2, 2) and eight (8) elements adjacent thereto as vertices, and having connections between the element positioned at (2, 2) and the eight (8) adjacent elements around the element as isotropic edges. In a similar manner, the pattern may include an isotropic graph with an element positioned at (3, 2) as the center, an isotropic graph with an element positioned at (2, 3) as the center, and an isotropic graph with an element positioned at (3, 3) as the center. A plurality of graphs respectively corresponding to a plurality of sub-arrays included in the pattern 100 may be stored as graph information and used when the pattern 100 is decoded.

The graph may be understood as information about a relationship between a central element of the sub-array and adjacent elements surrounding the central element. For example, in FIG. 1, the first sub-array 151 may correspond to an isotropic graph with the seventh element 107 as the center, and the graph may include information about a color of the seventh element 107, information about colors of adjacent elements surrounding the seventh element 107, information about a color sequence of the first sub-array 151, and information such as a distribution of pixel intensity between a center of the seventh element 107 and centers of the adjacent elements surrounding the seventh element 107. Because this neighborhood information may be maintained even when Gaussian blur is applied, a relatively high pattern recognition rate may be achieved even under a defocus environment by using graph information of the pattern.

Figure 8:
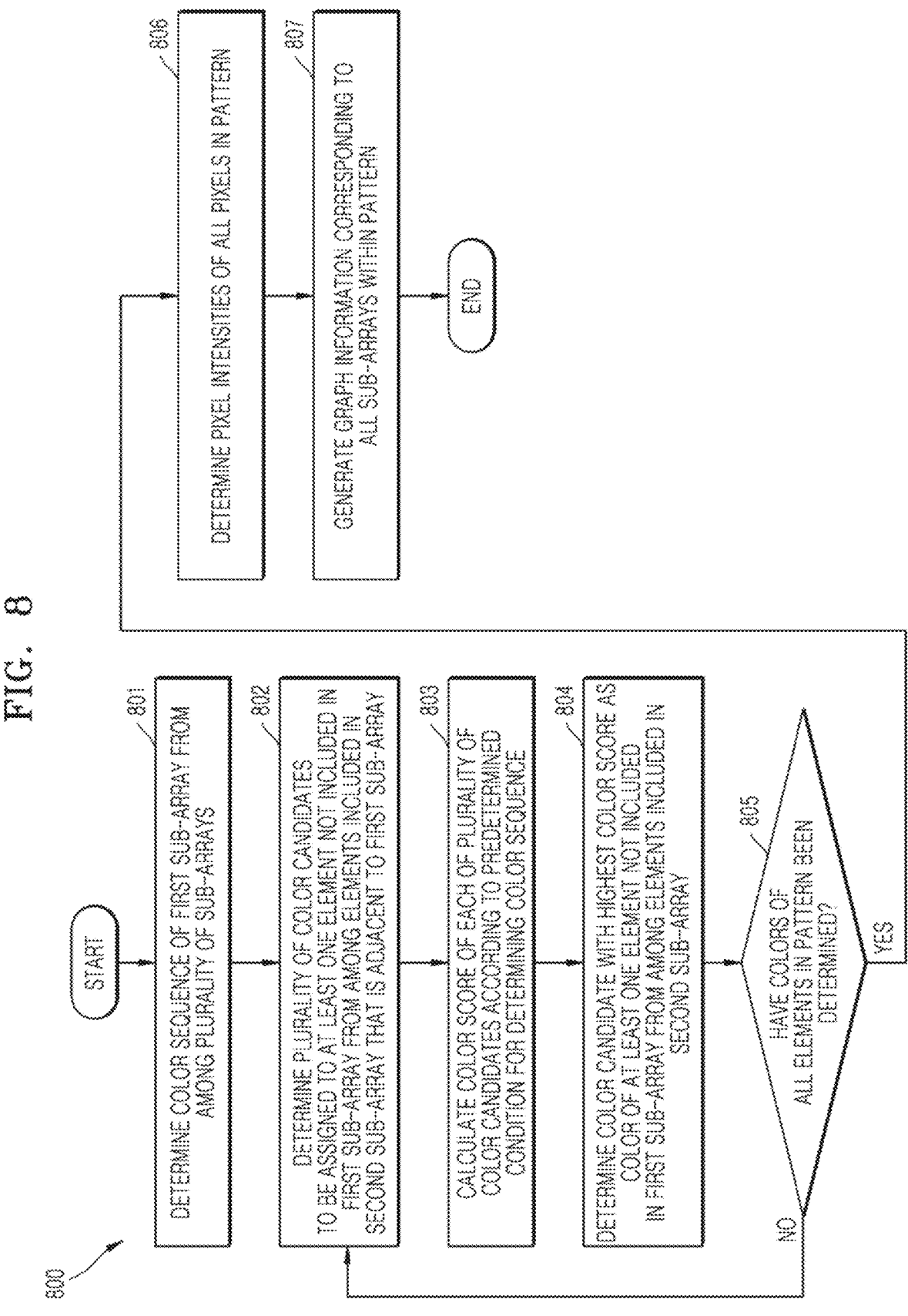
FIG. 8 is a flowchart of a method of generating a pattern, according to an embodiment.

FIG. 8 is a flowchart of a method 800 of generating the pattern 100, according to an embodiment, and FIG. 9 is a flowchart of a method of calculating a color score of color candidates, according to an embodiment. In FIGS. 8 and 9, the method of generating the pattern 100 is described by assuming that the size of the sub-array is 3×3. However, the size of the sub-array is not limited thereto, and for example, the size of the sub-array may be 3×1 (e.g., a 1D array) or 4×6 (e.g., the sub-array is 2D and is not a square shape). In addition, in FIGS. 8 and 9, the method of generating the pattern 100 may satisfy all of the first to third conditions. However, the pattern 100 may be generated to satisfy one or two of the first to third conditions. The method 800 of generating the pattern 100 may be performed by a pattern generation device 1300 of FIG. 13.

Referring to FIG. 8, in operation S801, a color sequence of a first sub-array from among a plurality of sub-arrays may be determined. The first sub-array may be arbitrarily set considering the convenience of implementation, and for example, similar to the first sub-array 151 of FIG. 1, the leftmost and uppermost sub-array may be set as the first sub-array.

As described above with reference to FIGS. 1 to 5, in operation 801, a color of each of elements included in the first sub-array may be determined to be different from a color of a neighboring element, and a color sequence of the first sub-array may be determined to satisfy at least one of the first to third conditions described above.

In operation 802, a plurality of color candidates to be assigned to at least one element not included in the first sub-array from among elements included in a second sub-array that is adjacent to the first sub-array may be determined. Here, the second sub-array may have at least some elements overlapping those of the first sub-array. For example, when the first sub-array 151 of FIG. 1 is the first sub-array, the second sub-array 152 may be the second sub-array. In such an example, because six (6) colors from among the elements of the second sub-array have already been determined, in operation 802, color candidates to be assigned to the remaining three (3) elements may be determined.

In operation 802, the plurality of color candidates to be assigned to at least one element not included in the first sub-array from among the elements included in the second sub-array may be determined as an arbitrary color by using a random number generation algorithm, for example.

In operation 803, a color score of each of the plurality of color candidates may be calculated according to predetermined conditions for determining a color sequence. Here, the predetermined conditions for determining a color sequence may include the first to third conditions described above, and the color score is intended to evaluate whether the color candidates satisfy the first to third conditions. In this case, as described above, the color score may be calculated differently depending on the priorities of the first to third conditions. For example, for a first color score corresponding to the first condition, a second color score corresponding to the second condition, and a third color score corresponding to the third condition, the color score may be calculated by assigning different weights to the first to third color scores according to the priorities of the first to third conditions. The calculation of a color score is described with reference to FIG. 9.

In operation 804, a color candidate with a highest color score may be determined as a color of at least one element not included in the first sub-array from among the elements included in the second sub-array. In this case, when two (2) or more color candidates have the same color score, one color candidate may be arbitrarily selected.

In operation 805, when colors of all elements of the pattern are not determined (NO in operation 805), the process returns to operation 802, and when colors of all elements of the pattern are determined, the process proceeds to operation 806 (YES in operation 805).

In operation 806, pixel intensities of all pixels of the pattern 100 may be determined. For example, the pixel intensity of each of the elements of the pattern 100 may be determined to follow a predetermined distribution with a peak at the center (e.g., Gaussian distribution), and a pixel intensity of a background portion other than the element may be determined as a constant value.

In operation 807, graph information corresponding to all sub-arrays within the pattern 100 may be generated. Here, the graph information may include graphs corresponding to all sub-arrays within the pattern. Each of the graphs may include each element within the corresponding sub-array as a vertex, and connections between adjacent elements as edges. The graph may include color information of each element included in the corresponding sub-array, color sequence information of the corresponding sub-array, and pixel intensity distribution information between centers of adjacent elements. The generated graph information may be used when decoding the pattern 100.

FIG. 9 is a flowchart of a method of calculating color scores of color candidates, according to an embodiment. Operations of FIG. 9 may correspond to operation 803 of FIG. 8.

Referring to FIG. 9, in operation 901, a color candidate including the same color as a neighboring element may be eliminated, the neighboring element being adjacent to at least one element not included in the first sub-array within the second sub-array from among the plurality of color candidates.

In operation 902, a color candidate in which the same color sequence as a color sequence corresponding to the second sub-array is present in the pattern 100 from among the plurality of color candidates may be eliminated.

Operations 901 and 902 may be understood to select, from among color candidates determined to be arbitrary colors, color candidates in which, as described above with reference to FIG. 1, a color of each element of the pattern 100 is different from a color of a neighboring element, and a color sequence corresponding to each sub-array is unique within the pattern.

In operation 903, first to third color scores may be determined for each of the remaining color candidates. The first to third color scores may correspond to the first to third conditions, respectively.

The first color score may be determined based on a distance between a color sequence corresponding to the second sub-array and color sequences corresponding to the remaining sub-arrays within the pattern. In this case, the distance between color sequences may be calculated by using the various distance metrics described above (e.g., Lee distance). For example, the first color score may increase as the distance (or, an average of distances) between the color sequence corresponding to the second sub-array and the color sequences corresponding to the remaining sub-arrays within the pattern increases, and the lowest score may be obtained when the distance between the color sequence corresponding to the second sub-array and at least one other color sequence is less than a predetermined threshold.

The second color score may be determined based on the color sequence corresponding to the second sub-array and a color sequence corresponding to at least one sub-array adjacent to the second sub-array. In this case, the distance between color sequences may be calculated by using the various distance metrics described above (e.g., Lee distance). For example, the second color score may increase with the decrease in the distance (or, average of distances) between the color sequence corresponding to the second sub-array and the color sequence corresponding to at least one adjacent sub-array.

The third color score may be calculated based on the number of colors included in each of the plurality of color categories from among colors included in the color sequence corresponding to the second sub-array. For example, when the color candidate group is RYGCBM and the color category is RGB, the third color score may increase with the decrease in RGB score as represented as an equation similar to Equation 2.

$$S_{RGB} = W_1 \times S_1 + W_2 \times S_2 \qquad \text{[Equation 2]}$$

$$S_1 = |N_R - N_G| + |N_G - N_B| + |N_R - N_B|$$

$S_2$=number of elements of which colors are in same color category as neighboring elements Referring to Equation 2, $S_{RGB}$ may represent the RGB score, $W_1$ may represent a first weight, $S_1$ may represent a first score, $W_2$ may represent a second weight, $S_2$ may represent a second score, $N_R$ may represent a number of colors included in red (R) color category, $N_G$ may represent a number of colors included in green (G) color category, and $N_B$ may represent a number of colors included in blue (B) color category. In an embodiment, the first and second weights may be predetermined values.

In operation 904, a final color score may be calculated by assigning predetermined weights to the first to third color scores according to the priorities of the first to third conditions. For example, when the first condition has a higher priority than the second and third conditions, a higher weight may be assigned to the first color score to calculate the final color score.

The method of generating the pattern 100, described with reference to FIGS. 8 and 9, may be understood as a combination of a process of determining a color of each element (e.g., operations 801 to 805), a process of determining a pixel intensity (e.g., operation 806), and a process of generating graph information (e.g., operation 807). Accordingly, it is noted that the same pattern 100 may also be generated in a different order from that shown in FIGS. 8 and 9.

FIG. 10 describe duplicate sequence generation using a self-index code, according to an embodiment.

Each sub-array of the pattern 100 may correspond to a color sequence, and all color sequence information within the pattern 100 may be used when decoding. As described above, the color sequence information may include a list of colors included in the sub-array. In addition, the color sequence information may include a self-index code indicating a position of each color within the color sequence. The self-index code may correspond to each element within a sub-array corresponding to the color sequence. When the pattern is generated (e.g., after operation 807 of FIG. 8), a self-index code may be added and stored in the color sequence and used when decoding.

Referring to FIG. 10, in a pattern, such as table 1000, four (4) sub-arrays of 3×3 size may be considered. A color sequence of a sub-array including an element of (2, 2) as a central element may be BRM YMY CGM, a color sequence of a sub-array including an element of (3, 2) as a central element may be RMY MYR GMG, a color sequence of a sub-array including an element of (2, 3) as a central element may be YMY CGM YCY, and a color sequence of a sub-array including an element of (3, 3) as a central element may be MYR GMG CYC.

In such an embodiment, each element within the sub-array may correspond to a color sequence to which a self-index code is added. For example, an element of (1, 1) may correspond to BRM YMY CGM 1, and an element of (2, 1) may correspond to BRM YMY CGM 2 and RMY MYR GMG 1. Alternatively, when the color sequence to which the self-index code is added is used, it may be seen that the element of (1, 1) is a first element of a sub-array corresponding to the color sequence BRM YMY CGM, and the element of (2, 1) is a second element of the sub-array corresponding to the color sequence BRM YMY CGM and at the same time a first element of a sub-array corresponding to the color sequence RMY MYR GMG. As described above, by adding a self-index code to a color sequence, each element may be represented as a plurality of duplicate color sequences.

That is, by adding the self-index code, spatial coding for specifying a position within a pattern may be performed on edge elements of which positions may be difficult to specify using color sequences alone. In other words, because elements positioned places other than an edge are central elements of a unique color sequence within the pattern, positions of the elements may be specified with the color sequence alone, but because elements positioned at edges do not have a sub-array having that element as the central element, the positions of the elements within the pattern cannot be specified with the color sequence alone. However, when a self-index code is added, a position of each element within a sub-array may be specified by using the self-index code.

In addition, because each element corresponds to a plurality of duplicate sequences, even when color modulation locally occurs in the pattern, an element of a portion where color modulation has occurred may be successfully recognized by using the one with the smallest error among the plurality of duplicate sequences during decoding, and because the self-index code is not affected by color modulation, the self-index code may be used for an integrity check when decoding.

Figure 11:
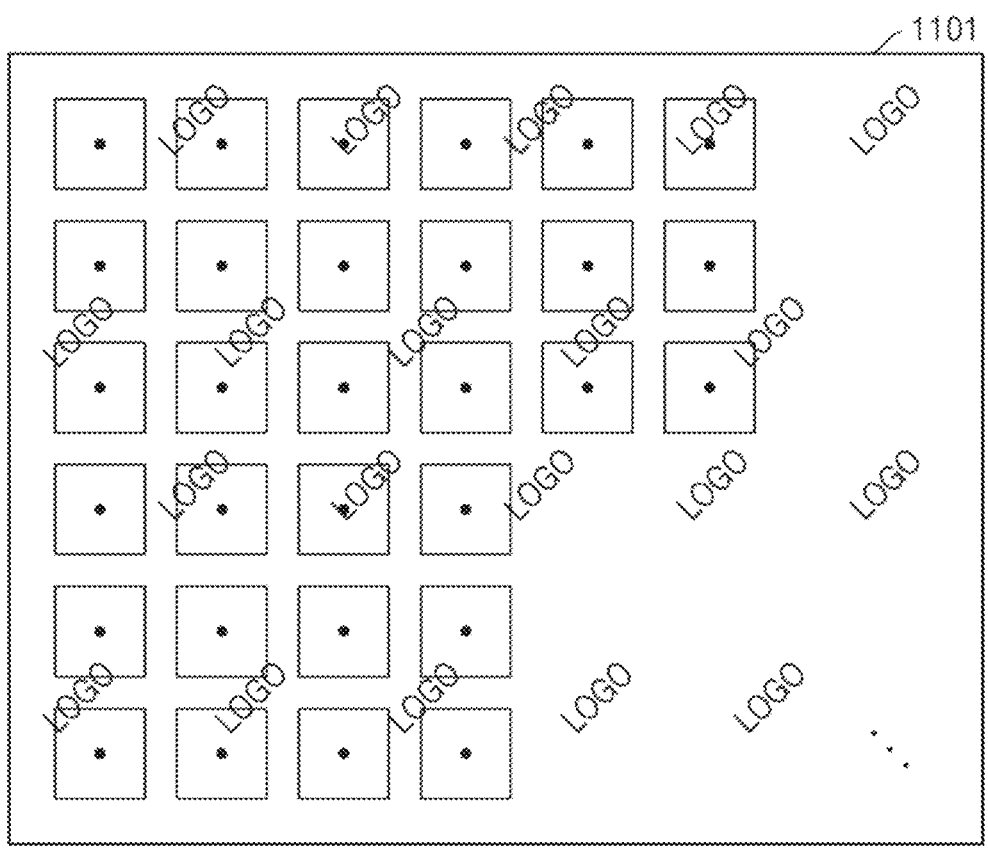
FIG. 11 describes an example of a pattern that may be modified, according to an embodiment.

FIG. 11 describes an example of the pattern 100 that may be modified, according to an embodiment.

The pattern 100, according to an embodiment, may be modified in various ways in addition to the color sequence, pixel intensity distribution, and graph information described above.

For example, as shown in FIG. 11, the pattern 100 may include additional characters and/or shapes, such as, but not limited to, a logo 1101 of a company or entity. In such an embodiment, the logo 1101 may be processed to be visible to the human eye, may be processed to be invisible to the human eye, and/or may function as a watermark. The pattern 100, according to an embodiment, may include a color sequence including colors selected from a color candidate group, and each color sequence is unique within the pattern 100, and a pixel intensity of each element may be configured to follow a predetermined distribution. Accordingly, for example, characters or shapes may be added to the pattern 100 by using a color not included in the color candidate group, or a pixel density of the added character or shape portion is distinguished from a pixel intensity distribution of each element. In this way, the pattern 100 may further include various information while minimizing the impact on the pattern recognition rate when decoding.

Figure 12:
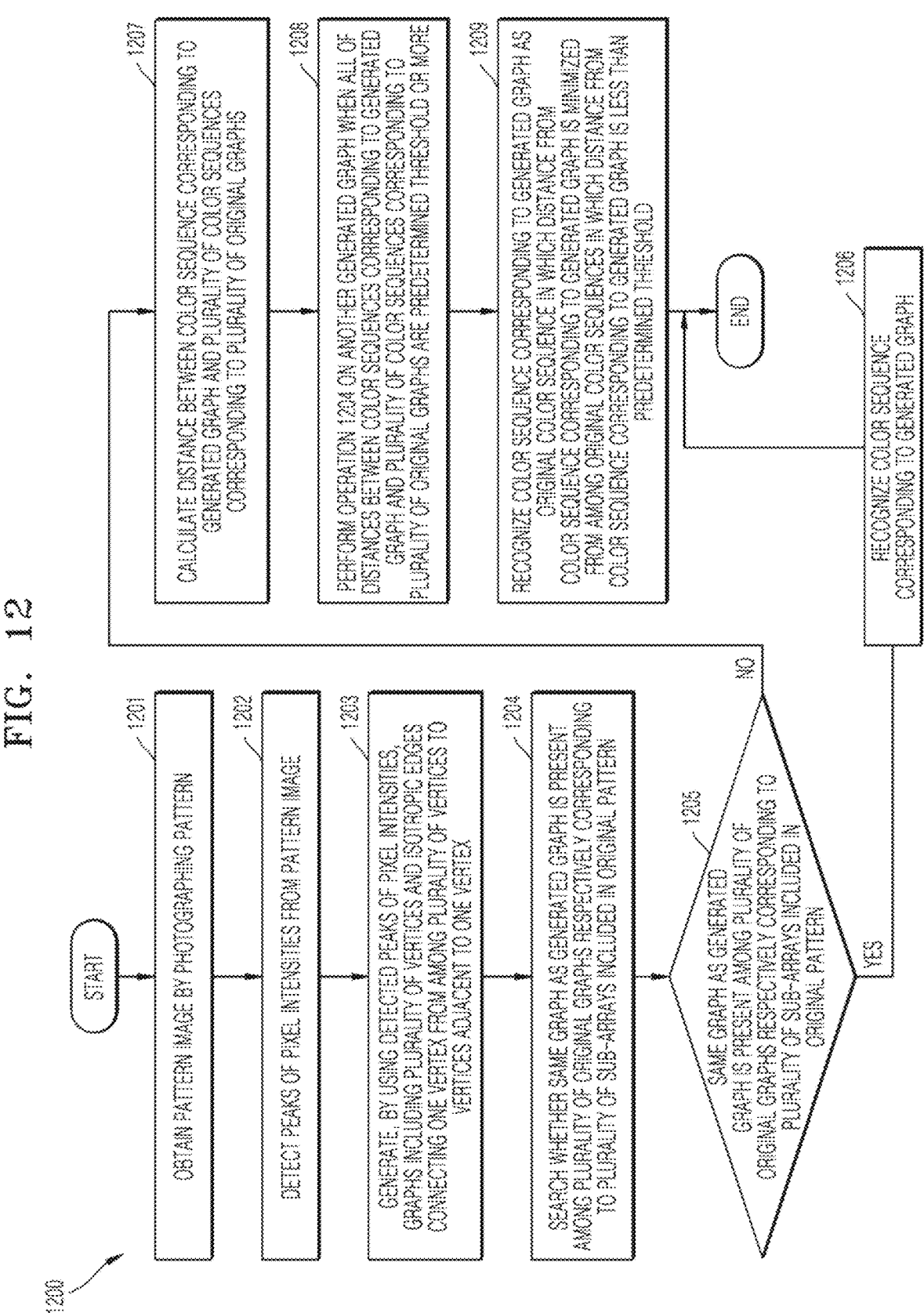
FIG. 12 is a flowchart of a method of decoding a pattern, according to an embodiment.

FIG. 12 is a flowchart of a method 1200 of decoding the pattern 100, according to an embodiment. The method 1200 of decoding the pattern 100 may be performed by a pattern decoding device 1400 of FIG. 14. Alternatively, when the pattern generation device 1300 and the pattern decoding device 1400 are implemented as one integrated device, the method 1200 may be performed by the integrated device.

In the present disclosure, decoding a pattern may include recognizing a color sequence included in a projected (or printed) pattern. For example, decoding a pattern may include obtaining a pattern image by photographing a projected (or printed) pattern, and searching the obtained pattern image for a color sequence included in an original pattern. In addition, decoding a pattern may include, in a case in which a color or shape of the obtained pattern image is modulated by a photographing environment (e.g., defocus, external lighting, or a color, shape, or pattern of a surface onto the pattern is projected (or printed)), when the same color sequence as the original pattern is not found in the pattern image, correcting the error.

Referring to FIG. 12, in operation 1201, a pattern image may be obtained by photographing the pattern 100. For example, the pattern image may be obtained by using a camera and/or an image sensor (e.g., a charge-coupled device (CCD), a complementary metal-oxide-semiconductor (CMOS), or the like). In such an example, depending on the photographing environment, the obtained pattern image may be a clear image without color and/or shape modulation and/or an image of which a color or shape is modulated.

In operation 1202, peaks of pixel intensities may be detected from the pattern image. Because the pixel intensities of pixels of the pattern follow a predetermined distribution (e.g., Gaussian distribution), pixel intensities of pixels of the pattern image also follow the same distribution. Accordingly, even in the pattern image, peaks having greater pixel intensities than surrounding pixels may be detected.

In operation 1203, by using the detected peaks of the pixel intensities, graphs including a plurality of vertices and an isotropic edge connecting one vertex from among the plurality of vertices to vertices adjacent to the vertex may be generated. In an embodiment, the number of vertices in each graph may be equal to the number of elements included in a sub-array of the original pattern 100. The generated graph may include information about colors of the vertices, information about a distribution of pixel intensities between the vertices, and information about a color sequence corresponding to the generated graph.

In operation 1204, it is searched whether the same graph as the generated graph is present among a plurality of original graphs respectively corresponding to a plurality of sub-arrays included in the original pattern. The original graph may be and/or may include information generated together when the original pattern is generated (e.g., operation 807 of FIG. 8). When the method 1200 of decoding a pattern is performed by a pattern decoding device (e.g., the pattern decoding device 1400 of FIG. 14), the pattern decoding device may receive the original graph in advance from a pattern generation device and store the received the original graph. Alternatively, when the method 1200 of decoding a pattern is performed by a device in which the pattern generation device and the pattern decoding device are integrated, the integrated device may store the original graph generated when the original pattern is generated. The graph information of the original pattern may include original graphs corresponding to all sub-arrays of the original pattern, and each of the original graphs may include information about colors of elements included in the corresponding sub-array, information about a pixel intensity distribution between the elements, and information about a color sequence corresponding to the sub-array.

When the same graph as the generated graph is present among the plurality of original graphs respectively corresponding to the plurality of sub-arrays included in the original pattern (YES in operation 1205), a color sequence corresponding to the generated graph may be recognized in operation 1206.

When the same graph as the generated graph is not present among the plurality of original graphs respectively corresponding to the plurality of sub-arrays included in the original pattern (NO in operation 1205), distances between a color sequence corresponding to the generated graph and a plurality of color sequences corresponding to the plurality of original graphs (operation 1207). For example, the distance between two color sequences may be calculated by using the various distance metrics described above (e.g., Lee distance).

When all of the distances between the color sequence corresponding to the generated graph and the plurality of color sequences corresponding to the plurality of original graphs are a predetermined threshold or more, in operation 1208, it may be determined that the color sequence corresponding to the generated graph is not present in the original pattern, and operation 1204 may be performed on another generated graph (operation 1209). In an embodiment, the predetermined threshold may be equal to a threshold set in the first condition.

In operation 1208, the color sequence corresponding to the generated graph may be recognized as an original color sequence of which a distance from the color sequence corresponding to the generated graph is minimized from among original color sequences of which a distance from the color sequence corresponding to the generated graph is less than the predetermined threshold (operation 1210).

Figure 13:
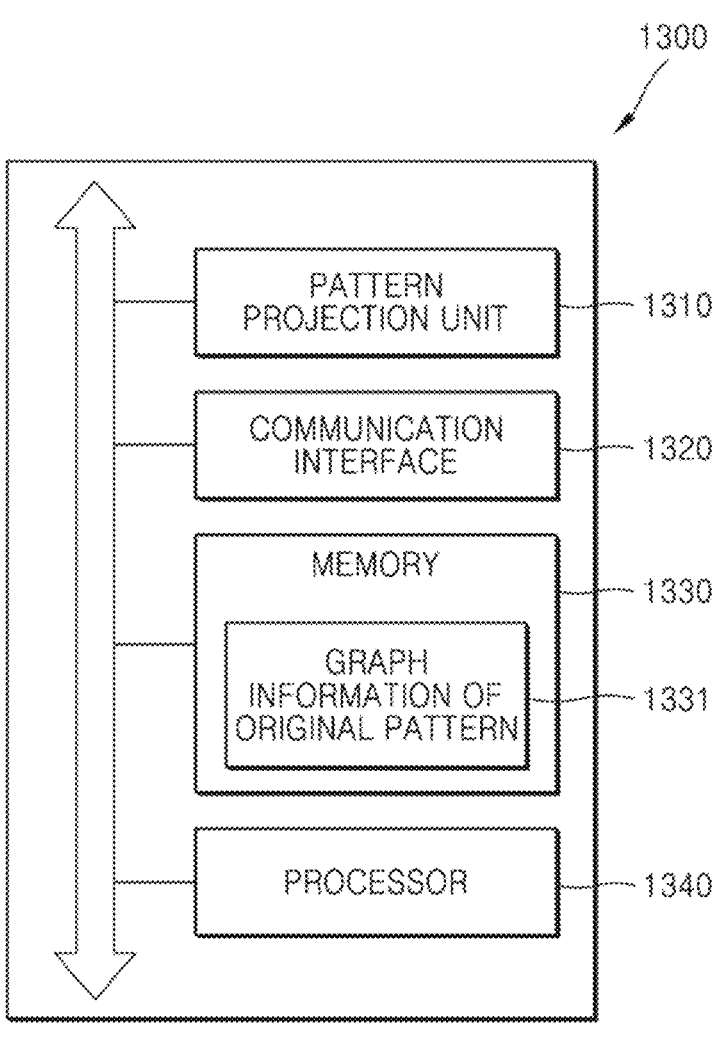
FIG. 13 is a block diagram of a pattern generation device, according to an embodiment.

FIG. 13 is a block diagram of a pattern generation device 1300, according to an embodiment.

The pattern generation device 1300 shown in FIG. 13 may generate a pattern by performing the pattern generation method 800 of FIGS. 8 and 9, and project the generated pattern. In an embodiment, the pattern generation device 1300 may include one or more of a pattern projection unit (projector) 1310, a communication interface 1320, a memory 1330, and a processor 1340. However, elements of the pattern generation device 1300 are not limited thereto, and the pattern generation device 1300 may include more elements than those shown in FIG. 13, or may not include at least one of the elements shown in FIG. 13. For example, the pattern generation device 1300 may be an integrated device that further includes elements of the pattern decoding device 1400 of FIG. 14.

In an embodiment, the pattern projection unit 1310 may be and/or may include an element for projecting the generated pattern onto a surface and may include a light source (e.g., high intensity discharge (HID) lamp, an ultra-high performance (UMP) lamp, a light-emitting diode (LED) lamp, a laser, a xenon lamp, or the like) and at least one projection lens. The pattern projection unit 1310 may project an image in addition to a pattern onto a surface.

In an embodiment, the communication interface 1320 may be and/or may include an element that enables the pattern generation device 1300 to communicate with an external device, and may include, for example, a short-range communication unit, a long-distance communication unit, or the like. The communication interface 1320 may be configured to include a communication chipset that supports various communication protocols, and may receive a signal from the outside and output the received signal to the processor 1340, and/or may transmit a signal output from the processor 1340 to the outside.

In an embodiment, the memory 1330 may be and/or may include an element for storing various programs or data and may include a storage medium, such as, but not limited to, a read-only memory (ROM), a random-access memory (RAM), a hard disk, a compact disc ROM (CD-ROM), a digital video disc (DVD), and/or a combination of storage media. In an embodiment, the memory 1330 may not be present separately and may be configured to be included in the processor 1340. The memory 1330 may be configured as a volatile memory, a non-volatile memory, or a combination of a volatile memory and a non-volatile memory. Programs for performing the operations of the pattern generation method 800 described above may be stored in the memory 1330. When a pattern is generated, the memory 1330 may store graph information 1331 of an original pattern. The pattern generation device 1300 may transmit the graph information 1331 of the original pattern to the pattern decoding device 1400 through the communication interface 1320.

In an embodiment, the processor 1340 may be and/or may include an element configured to control a series of processes so that the pattern generation device 1300 operates, and may include one or more processors. The one or more processors may be and/or may include general-purpose processors such as, but not limited to, a central processing unit (CPU), an application processor (AP), a digital signal processor (DSP), graphics-specific processors such as a graphics processing unit (GPU) or a vision processing unit (VPU), or dedicated artificial intelligence processors, such as a neural processing unit (NPU). When the one or more processors are the dedicated artificial intelligence processors, the dedicated artificial intelligence processors may be designed in a hardware structure that may be specific to dealing with a particular artificial intelligence model.

In an embodiment, the processor 1340 may record data to the memory 1330 and/or read data stored in the memory 1330, and in particular execute a program stored in the memory 1330 to process data according to predefined operation rules. Accordingly, the processor 1340 may perform the operations of the pattern generation method 800 described above.

Figure 14:
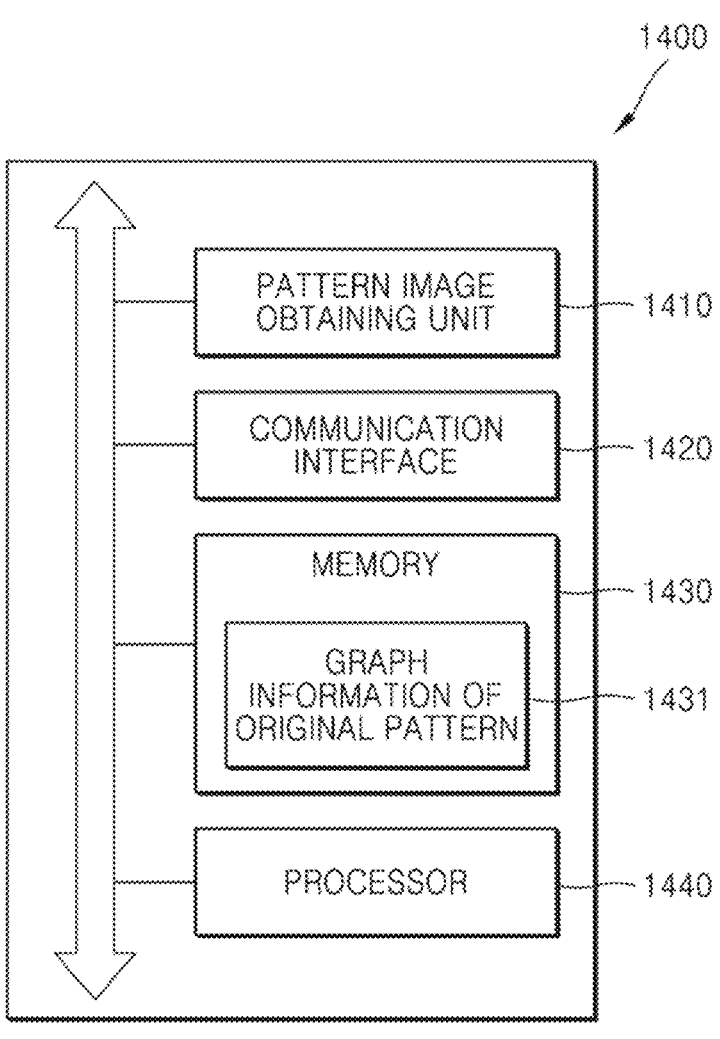
FIG. 14 is a block diagram of a pattern decoding device, according to an embodiment.

FIG. 14 is a block diagram of the pattern decoding device 1400 according to an embodiment.

The pattern decoding device 1400 shown in FIG. 14 may perform the pattern decoding method 1200 of FIG. 12. In an embodiment, the pattern decoding device 1400 may include one or more of a pattern image obtaining unit 1410, a communication interface 1420, the memory 1330, and the processor 1340. However, elements of the pattern decoding device 1400 are not limited thereto, and the pattern decoding device 1400 may include more elements than those shown in FIG. 14, or may not include at least one of the elements shown in FIG. 14. For example, the pattern decoding device 1400 may be a mobile device (e.g., a smartphone, a smartwatch, a tablet, a personal computer (PC), or the like) that may further include a display on which a touch input may be received. In an embodiment, the pattern decoding device 1400 may be an integrated device further including the elements of the pattern generation device 1300 of FIG. 13.

In an embodiment, the pattern image obtaining unit 1410 may be and/or may include an element for obtaining a pattern image by photographing a projected (or printed) pattern and may include a camera or an image sensor (e.g., a CCD, a CMOS device, or the like).

In an embodiment, the communication interface 1420 may be and/or may include an element that enables the pattern decoding device 1400 to communicate with an external device, and may include, for example, a short-range communication unit, a long-distance communication unit, or the like. The communication interface 1420 may be configured to include a communication chipset that supports various communication protocols, and may receive a signal from the outside and output the received signal to the processor 1440, and/or may transmit a signal output from the processor 1440 to the outside. The pattern decoding device 1400 may receive graph information 1431 and/or an original pattern from the pattern generation device 1300 through the communication interface 1420 and store the received graph information 1431 in a memory 1430.

In an embodiment, the memory 1430 may be and/or may include an element for storing various programs or data and may include a storage medium, such as a ROM, a RAM, a hard disk, a CD-ROM, and a DVD, or a combination of storage media. In an embodiment, the memory 1430 may not be present separately and may be configured to be included in the processor 1440. The memory 1430 may be configured as a volatile memory, a non-volatile memory, or a combination of a volatile memory and a non-volatile memory. Programs for performing the operations of the pattern decoding method 1200 described above may be stored in the memory 1430. The memory 1430 may store the graph information 1431 of the original pattern of the original pattern received from the pattern generation device 1300.

In an embodiment, the processor 1440 may be and/or may include an element configured to control a series of processes so that the pattern decoding device 1400 operates, and may include one or more processors. The one or more processors may be and/or may include general-purpose processors such as a CPU, an AP, or a DSP, graphics-specific processors such as a GPU or a VPU, or dedicated artificial intelligence processors, such as an NPU. When the one or more processors are the dedicated artificial intelligence processors, the dedicated artificial intelligence processors may be designed in a hardware structure that may be specific to dealing with a particular artificial intelligence model.

In an embodiment, the processor 1440 may record data to the memory 1430 and/or read data stored in the memory 1430, and in particular execute a program stored in the memory 1430 to process data according to predefined operation rules. Accordingly, the processor 1440 may perform the operations of the pattern decoding method 1200 described above.

In FIGS. 13 and 14, the pattern generation device 1300 and the pattern decoding device 1400 are illustrated separate devices. However, the two devices may be implemented as one integrated device. For example, the integrated device may include a projector capable of generating and projecting a pattern and then photographing and decoding the projected pattern, so as to identify information about a surface onto which an image is to be projected (e.g., color, pattern, curve, or the like of the surface).

Figure 15:
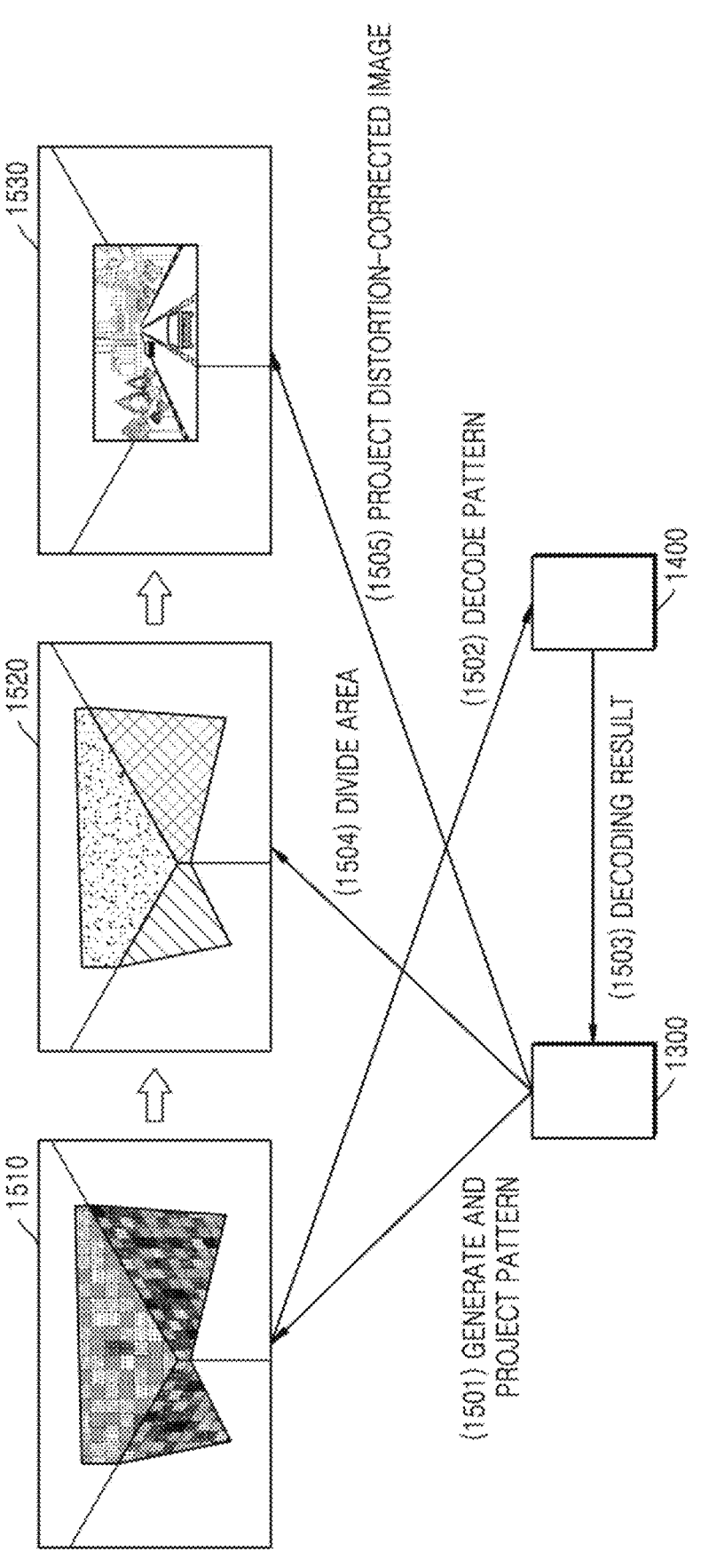
FIG. 15 shows a use example of a pattern, according to an embodiment.

FIG. 15 shows a use example of the pattern 100, according to an embodiment.

Referring to FIG. 15, the pattern 100, according to an embodiment, may be used to identify information about a surface onto which an image is to be projected (e.g., geometric structure, pattern, color, or the like) before the image is projected, and correct distortion on the image based on the surface information. FIG. 15 shows a situation in which an image is projected at a corner where three surfaces (e.g., two walls and one ceiling) meet. However, the present disclosure is not limited in this regard, and aspects of the present disclosure may be applied to various other situations. When a user desires to project and watch an image at a corner of a room by using a projector, in a case in which the image is projected without distortion correction, the image may not have a rectangular shape and/or may be distorted, which may prevent the user from seeing a flat screen. In such an example, the user may project a pattern by using the projector (e.g., the pattern generation device 1300) and photograph and decode the projected pattern by using a smartphone (e.g., the pattern decoding device 1400) to watch a distortion-corrected image.

In operation 1501, the pattern generation device 1300 may generate a pattern and project the pattern at a corner of the room. Because the pattern is divided and projected onto three surfaces, an overall shape of the pattern may be distorted along a surface shape, as shown in a photo 1510 of FIG. 15.

In operation 1502, the pattern decoding device 1400 may capture and decode the pattern.

In operation 1503, the pattern decoding device 1400 may transmit a result of the decoding to the pattern generation device 1300. In this case, the decoding result may include a color sequence recognized by the pattern decoding device 1400.

In operation 1504, the pattern generation device 1300 may divide a corner portion of the room into three areas based on the decoding result. For example, the pattern generation device 1300 may identify a geometric structure of a surface based on a geometric shape of the recognized color sequence and divide the surface into three areas as shown in a photo 1520 of FIG. 15 according to the identified geometric structure of the surface.

In operation 1505, the pattern generation device 1300 may project the distortion-corrected image to be suitable for the three areas. When differently corrected images are projected on the three areas, the image may be displayed in the same way as if the image was projected onto a flat surface, as shown in a photo 1530 of FIG. 15.

Figure 16:
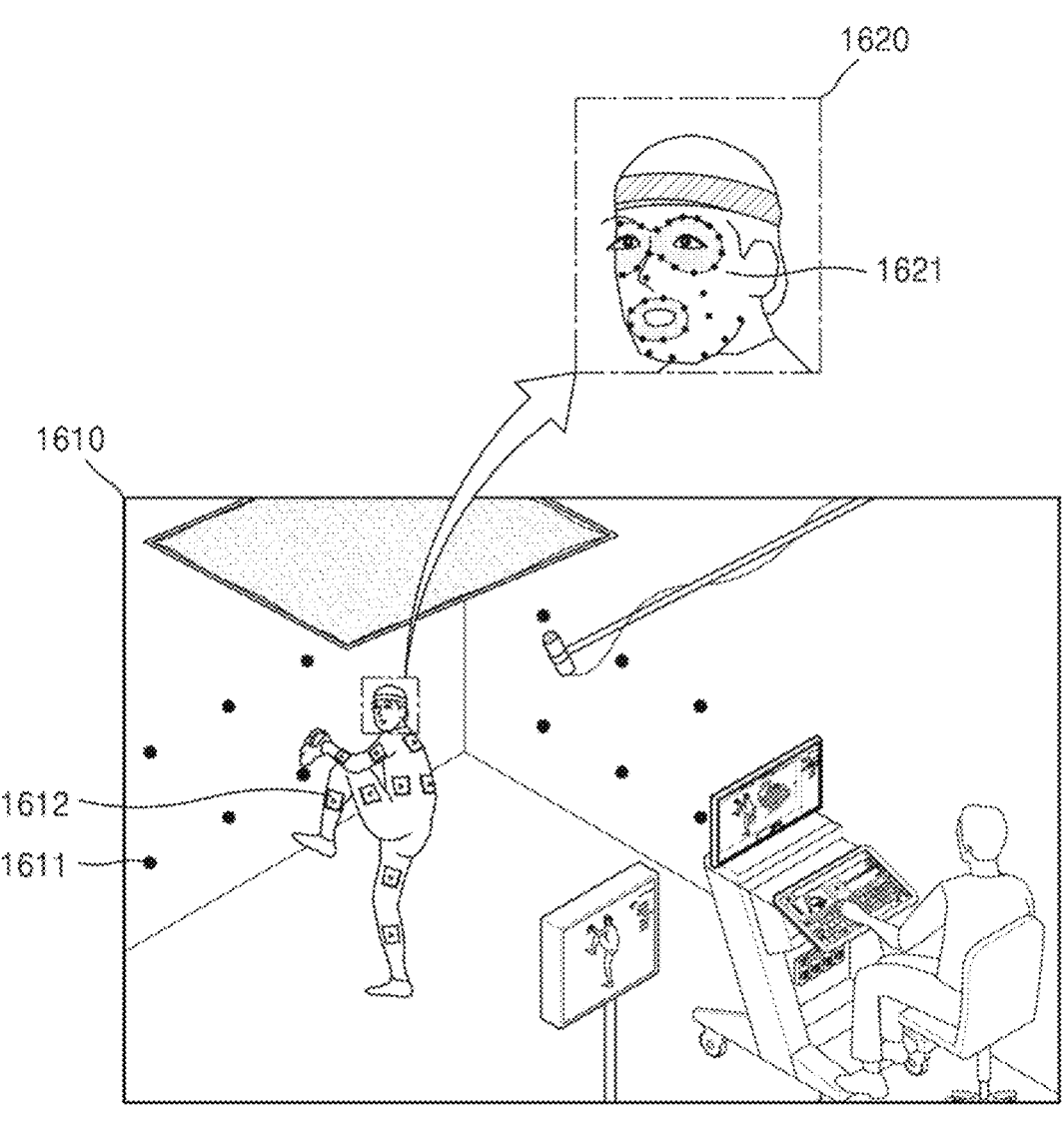
FIG. 16 shows another use example of a pattern, according to an embodiment.

FIG. 16 shows a use example of the pattern 100, according to an embodiment.

The pattern 100, according to an embodiment, may be used as a marker for shooting computer graphics movies. In FIG. 16, a photo 1610 shows a computer graphics movie shooting scene, and a photo 1620 is an enlarged image of an actor's face. The pattern 100 may be used as a marker 1611 for inserting a surrounding background of the actor into a scene by using computer graphics, as a marker 1612 for capturing movements of the actor, or as a marker 1621 for capturing facial expressions of the actor.

Because a movie set has ambient lighting of various colors and brightness, and actors act while moving around within a set including a plurality of surfaces, in a screen in which a marker is photographed, there is a relatively high probability that the marker may not be photographed clearly due to color modulation caused by ambient lighting and/or defocusing caused by a movement of the actor. As described above, the pattern 100, according to an embodiment, may have a relatively high recognition rate even in environments where color and shape modulation may occur, and thus, the pattern 100 may be effectively applied even in environments where it may be relatively difficult to obtain clear images, such as, but not limited to, movie sets.

According to an aspect of the present disclosure, a method may include generating a pattern, and projecting the pattern. A plurality of elements may be arranged in the pattern. The method may further include selecting a color for each of the plurality of elements from a color candidate group including a plurality of colors with equal differences between the plurality of colors. The color of each of the plurality of elements may be different from a neighboring color of a neighboring element adjacent to that element. A plurality of color sequences corresponding to a plurality of sub-arrays may be different from each other. The plurality of sub-arrays may include at least one element from among the plurality of elements. Distances between pairs of color sequences of the plurality of color sequences within the pattern may be greater than or equal to a predetermined threshold.

In an embodiment, the color candidate group may comprise at least one of: a black and white (BW) color candidate; a red, green, and blue (RGB) color candidate; a cyan, magenta, and yellow (CMY) color candidate; or a red, yellow, green, cyan, blue, magenta (RYGCBM) color candidate.

In an embodiment, the method may further comprise minimizing a distance between each of the plurality of color sequences and at least one color sequence adjacent to that color sequence.

In an embodiment, the method may further comprise determining each of the plurality of color sequences to comprise at least one color from a plurality of color categories corresponding to a plurality of reference colors from among the plurality of colors comprised in the color candidate group, and wherein, in a hue circle in which complementary colors of the colors comprised in the color candidate group face each other, each of the plurality of color categories comprises a corresponding reference color and colors adjacent to the corresponding reference color.

In an embodiment, the method may further comprise determining a pixel intensity of each of the plurality of elements that follows a predetermined distribution having peaks in a center of each of the plurality of elements.

In an embodiment, the pattern may comprise graph information, wherein the graph information comprises a plurality of graphs respectively corresponding to the plurality of sub-arrays, and wherein each of the plurality of graphs may comprise at least one vertex indicating the at least one element comprised in a corresponding sub-array and isotropic edges indicating connections between a central element of the corresponding sub-array and elements adjacent to the central element.

In an embodiment, the generating the pattern may comprise determining a first color sequence corresponding to a first sub-array from among the plurality of sub-arrays; and determining a second color sequence corresponding to a second sub-array from among the plurality of sub-arrays that is adjacent to the first sub-array, wherein the determining of the second color sequence corresponding to the second sub-array may comprise determining a plurality of color candidates to be assigned to at least one element not comprised in the first sub-array from among elements comprised in the second sub-array; determining a color score of each of the plurality of color candidates according to a predetermined color sequencing condition; and determining a color candidate with a highest color score as a color of the at least one element not comprised in the first sub-array.

In an embodiment, the generating the pattern may comprise determining a pixel intensity of each element of the plurality of elements of the pattern; and generating graph information corresponding to the plurality of sub-arrays within the pattern.

In an embodiment, the determining the color score may comprise eliminating a first color candidate comprising a same color as the neighboring element adjacent to the at least one element not comprised in the first sub-array within the second sub-array from among the plurality of color candidates; eliminating a second color candidate in which a same color sequence as the color sequence corresponding to the second sub-array is present within the pattern from among the plurality of color candidates; and determining a color score for each of remaining color candidates from among the plurality of color candidates.

In an embodiment, the color score may comprise a first color score, a second color score, and a third color score, and wherein the determining the color score for each of the remaining color candidates may comprise: determining the first color score based on the distances between the color sequence corresponding to the second sub-array and color sequences corresponding to remaining sub-arrays of the plurality of sub-arrays within the pattern; determining the second color score based on the distance between the color sequence corresponding to the second sub-array and a color sequence corresponding to at least one sub-array adjacent to the second sub-array; determining the third color score based on a number of colors comprised in each of a plurality of color categories from among colors comprised in the color sequence corresponding to the second sub-array; and determining the color score by assigning predetermined weights to the first color score, the second color score, and the third color score.

In an embodiment, the method may further comprise decoding the projected pattern, wherein the decoding the projected pattern may comprise obtaining a pattern image by capturing the projected pattern with an image sensor; detecting peaks of pixel intensities from the pattern image; generating, by using the peaks of the pixel intensities, a graph comprising a plurality of vertices and isotropic edges coupling one vertex from among the plurality of vertices with vertices adjacent to a vertex of the plurality of vertices; searching whether a same graph as the generated graph is comprised by a plurality of original graphs respectively corresponding to the plurality of sub-arrays comprised in an original pattern; based on the same graph as the generated graph not being comprised by the plurality of original graphs, determining a distance between a color sequence corresponding to the generated graph and a plurality of original color sequences corresponding to the plurality of original graphs; and recognizing the color sequence corresponding to the generated graph as an original color sequence in which a distance from the color sequence corresponding to the generated graph is minimized from among original color sequences in which a distance from the color sequence corresponding to the generated graph is less than a second predetermined threshold.

According to an aspect of the present disclosure, an electronic device may include a memory storing a program for generating and decoding a pattern in which a plurality of elements are arranged, at least one processor communicatively coupled with the memory, and a pattern projector configured to project the generated pattern. The program, when executed by the at least one processor, may cause the electronic device to select a color for each of the plurality of elements from a color candidate group including a plurality of colors with equal differences between the plurality of colors, determine the color of each of the plurality of elements to be different from a neighboring color of a neighboring element adjacent to that element, determine the color of each of the plurality of elements such that a plurality of color sequences corresponding to a plurality of sub-arrays are different from each other, the plurality of sub-arrays including at least one element from among the plurality of elements. Distances between pairs of color sequences of the plurality of color sequences within the pattern may be greater than or equal to a predetermined threshold.

According to an aspect of the present disclosure, a method of generating a pattern in which a plurality of elements are arranged, may include determining a color sequence corresponding to a first sub-array from among a plurality of sub-arrays, each sub-array of the plurality of sub-arrays including at least one element from among the plurality of elements, determining a plurality of color candidates to be assigned to at least one element not included in the first sub-array from among elements included in a second sub-array of the plurality of sub-arrays that is adjacent to the first sub-array, determining a color score of each of the plurality of color candidates according to a predetermined color sequencing condition, and determining a color candidate with a highest color score as a color of the at least one element not included in the first sub-array.

According to an aspect of the present disclosure, an electronic device may include a memory storing a program for generating a pattern in which a plurality of elements are arranged, and at least one processor communicatively coupled with the memory. The program, when executed by the at least one processor, causes the electronic device to determine a color sequence corresponding to a first sub-array from among a plurality of sub-arrays, each sub-array of the plurality of sub-arrays including at least one element from among the plurality of elements, determine a plurality of color candidates to be assigned to at least one element not included in the first sub-array from among elements included in a second sub-array of the plurality of sub-arrays that is adjacent to the first sub-array, determine a color score of each of the plurality of color candidates according to a predetermined color sequencing condition, and determine a color candidate with a highest color score as a color of the at least one element not included in the first sub-array.

According to an aspect of the present disclosure, a method of decoding a pattern in which a plurality of elements are arranged may include obtaining a pattern image by capturing the pattern, detecting peaks of pixel intensities from the pattern image, generating, by using the peaks of the pixel intensities, a graph including a plurality of vertices and isotropic edges coupling one vertex from among the plurality of vertices with vertices adjacent to a vertex of the plurality of vertices, searching whether a same graph as the generated graph is included by a plurality of original graphs respectively corresponding to a plurality of sub-arrays included in an original pattern, based on the same graph as the generated graph not being included by the plurality of original graphs, determining a distance between a color sequence corresponding to the generated graph and a plurality of original color sequences corresponding to the plurality of original graphs, and recognizing the color sequence corresponding to the generated graph as an original color sequence in which a distance from the color sequence corresponding to the generated graph is minimized from among original color sequences in which a distance from the color sequence corresponding to the generated graph is less than a predetermined threshold.

According to an aspect of the present disclosure, an electronic device may include a memory storing a program for decoding a pattern in which a plurality of elements are arranged, at least one processor communicatively coupled with the memory, and a pattern image sensor configured to obtain a pattern image by capturing the pattern. The program, when executed by the at least one processor, may cause the electronic device to detect peaks of pixel intensities from the pattern image, generate, by using the peaks of the pixel intensities, a graph including a plurality of vertices and isotropic edges coupling one vertex from among the plurality of vertices with vertices adjacent to a vertex of the plurality of vertices, search whether a same graph as the generated graph is included by a plurality of original graphs respectively corresponding to a plurality of sub-arrays included in an original pattern, based on the same graph as the generated graph not being included by the plurality of original graphs, determine a distance between a color sequence corresponding to the generated graph and a plurality of original color sequences corresponding to the plurality of original graphs, and recognize the color sequence corresponding to the generated graph as an original color sequence in which a distance from the color sequence corresponding to the generated graph is minimized from among original color sequences in which a distance from the color sequence corresponding to the generated graph is less than a predetermined threshold.

According to an aspect of the present disclosure, a non-transitory computer readable recording medium storing one or more instructions that, when executed by the computer, cause the computer to perform a method may comprise generating a pattern, and projecting the pattern. A plurality of elements may be arranged in the pattern. The method may further include selecting a color for each of the plurality of elements from a color candidate group including a plurality of colors with equal differences between the plurality of colors. The color of each of the plurality of elements may be different from a neighboring color of a neighboring element adjacent to that element. A plurality of color sequences corresponding to a plurality of sub-arrays may be different from each other. The plurality of sub-arrays may include at least one element from among the plurality of elements. Distances between pairs of color sequences of the plurality of color sequences within the pattern may be greater than or equal to a predetermined threshold.

While the present disclosure has been described with reference to illustrative embodiments, this description is not intended to be construed in a limiting sense. Various modifications and combinations of the illustrative embodiments, as well as other embodiments of the present disclosure, may be apparent to persons skilled in the art upon reference to the description. It is therefore intended that the appended claims encompass any such modifications or embodiments.

What is claimed is:

1. A method comprising:
generating a pattern; and
projecting the pattern,
wherein a plurality of elements are arranged in the pattern,
wherein the method further comprises selecting a color
for each of the plurality of elements from a color
candidate group comprising a plurality of colors with
equal differences between the plurality of colors,
wherein a difference between colors is calculated based
on a color difference metric,
wherein the color of each element of the plurality of
elements is different from a color of a neighboring
element adjacent to the element,
wherein a plurality of color sequences corresponding to a
plurality of sub-arrays are different from each other,
wherein the plurality of sub-arrays comprises at least one
element from among the plurality of elements,
wherein distances between pairs of color sequences of the
plurality of color sequences within the pattern are
greater than or equal to a first predetermined threshold,
wherein the pattern comprises graph information,
wherein the graph information comprises a plurality of
graphs respectively corresponding to the plurality of
sub-arrays, and
wherein each of the plurality of graphs comprises at least
one vertex indicating the at least one element com-
prised in a corresponding sub-array and isotropic edges indicating connections between a central element of the corresponding sub-array and elements adjacent to the central element.

2. The method of claim 1, wherein the color candidate group comprises at least one of:

a black and white (BW) color candidate;

a red, green, and blue (RGB) color candidate;

a cyan, magenta, and yellow (CMY) color candidate; or a red, yellow, green, cyan, blue, magenta (RYGCBM) color candidate.

3. The method of claim 1, further comprising:

minimizing a distance between each of the plurality of color sequences and at least one color sequence adjacent to that color sequence.

4. The method of claim 1, further comprising determining each of the plurality of color sequences to comprise at least one color from a plurality of color categories corresponding to a plurality of reference colors from among the plurality of colors comprised in the color candidate group, and wherein, in a hue circle in which complementary colors of the colors comprised in the color candidate group face each other, each of the plurality of color categories comprises a corresponding reference color and colors adjacent to the corresponding reference color.

5. The method of claim 1, further comprising determining a pixel intensity of each of the plurality of elements that follows a predetermined distribution having peaks in a center of each of the plurality of elements.

6. The method of claim 1, wherein the generating the pattern comprises:

determining a first color sequence corresponding to a first sub-array from among the plurality of sub-arrays; and determining a second color sequence corresponding to a second sub-array from among the plurality of sub-arrays that is adjacent to the first sub-array, and wherein the determining of the second color sequence corresponding to the second sub-array comprises:

determining a plurality of color candidates to be assigned to at least one element not comprised in the first sub-array from among elements comprised in the second sub-array;

determining a color score of each of the plurality of color candidates according to a predetermined color sequencing condition; and determining a color candidate with a highest color score as a color of the at least one element not comprised in the first sub-array.

7. The method of claim 6, wherein the determining the color score comprises:

eliminating a first color candidate comprising a same color as the neighboring element adjacent to the at least one element not comprised in the first sub-array within the second sub-array from among the plurality of color candidates;

eliminating a second color candidate in which a same color sequence as the color sequence corresponding to the second sub-array is present within the pattern from among the plurality of color candidates; and determining a color score for each of remaining color candidates from among the plurality of color candidates.

8. The method of claim 7, wherein the color score comprises a first color score, a second color score, and a third color score, and wherein the determining the color score for each of the remaining color candidates comprises:

determining the first color score based on the distances between the color sequence corresponding to the second sub-array and color sequences corresponding to remaining sub-arrays of the plurality of sub-arrays within the pattern;

determining the second color score based on a distance between the color sequence corresponding to the second sub-array and a color sequence corresponding to at least one sub-array adjacent to the second sub-array;

determining the third color score based on a number of colors comprised in each of a plurality of color categories from among colors comprised in the color sequence corresponding to the second sub-array; and determining the color score by assigning predetermined weights to the first color score, the second color score, and the third color score.

9. The method of claim 1, further comprising:

decoding the projected pattern, wherein the decoding the projected pattern comprises:

obtaining a pattern image by capturing the projected pattern with an image sensor;

detecting peaks of pixel intensities from the pattern image;

generating, by using the peaks of the pixel intensities, a graph comprising a plurality of vertices and isotropic edges coupling one vertex from among the plurality of vertices with vertices adjacent to a vertex of the plurality of vertices;

searching whether a same graph as the generated graph is comprised by a plurality of original graphs respectively corresponding to the plurality of sub-arrays comprised in an original pattern;

based on the same graph as the generated graph not being comprised by the plurality of original graphs, determining a first distance between a color sequence corresponding to the generated graph and a plurality of original color sequences corresponding to the plurality of original graphs; and recognizing the color sequence corresponding to the generated graph as an original color sequence in which a second distance from the color sequence corresponding to the generated graph is minimized from among original color sequences in which a third distance from the color sequence corresponding to the generated graph is less than a second predetermined threshold.

10. An electronic device comprising:

a memory storing a program for generating and decoding a pattern in which a plurality of elements are arranged;

at least one processor operatively coupled with the memory; and a pattern projector configured to project the generated pattern, wherein the program, when executed by the at least one processor, causes the electronic device to:

select a color for each of the plurality of elements from a color candidate group comprising a plurality of colors with equal differences between the plurality of colors, a difference between colors being calculated based on a color difference metric;

determine the color of each element of the plurality of elements to be different from a color of a neighboring element adjacent to the element; and determine the color of each of the plurality of elements such that a plurality of color sequences corresponding to a plurality of sub-arrays are different from each other, the plurality of sub-arrays comprising at least one element from among the plurality of elements, wherein distances between pairs of color sequences of the plurality of color sequences within the pattern are greater than or equal to a first predetermined threshold, wherein the pattern comprises graph information, wherein the graph information comprises a plurality of graphs respectively corresponding to the plurality of sub-arrays, and wherein each of the plurality of graphs comprises at least one vertex indicating the at least one element comprised in a corresponding sub-array and isotropic edges indicating connections between a central element of the corresponding sub-array and elements adjacent to the central element.

11. The electronic device of claim 10, wherein the program, when executed by the at least one processor, further causes the electronic device to:

minimize a distance between each of the plurality of color sequences and at least one color sequence adjacent to each of the plurality of color sequences.

12. The electronic device of claim 10, wherein the program, when executed by the at least one processor, further causes the electronic device to:

determine each of the plurality of color sequences to comprise at least one color from a plurality of color categories corresponding to a plurality of reference colors from among the plurality of colors comprised in the color candidate group, and wherein, in a hue circle in which complementary colors of the colors comprised in the color candidate group face each other, each of the plurality of color categories comprises a corresponding reference color and colors adjacent to the corresponding reference color.

13. The electronic device of claim 10, wherein the program, when executed by the at least one processor, further causes the electronic device to:

determine a pixel intensity of each of the plurality of elements that follows a predetermined distribution having peaks in a center of each of the plurality of elements.

14. The electronic device of claim 10, wherein the program, when executed by the at least one processor, further causes the electronic device to:

determine a first color sequence corresponding to a first sub-array from among the plurality of sub-arrays; and determine a second color sequence corresponding to a second sub-array from among the plurality of sub-arrays that is adjacent to the first sub-array, and wherein to determine of the second color sequence corresponding to the second sub-array comprises to:

determine a plurality of color candidates to be assigned to at least one element not comprised in the first sub-array from among elements comprised in the second sub-array;

determine a color score of each of the plurality of color candidates according to a predetermined color sequencing condition; and determine a color candidate with a highest color score as a color of the at least one element not comprised in the first sub-array.

15. The electronic device of claim 14, wherein the program, when executed by the at least one processor, further causes the electronic device to:

eliminate a first color candidate comprising a same color as the neighboring element adjacent to the at least one element not comprised in the first sub-array within the second sub-array from among the plurality of color candidates;

eliminate a second color candidate in which a same color sequence as the color sequence corresponding to the second sub-array is present within the pattern from among the plurality of color candidates; and determine a color score for each of remaining color candidates from among the plurality of color candidates.

16. The electronic device of claim 15, wherein the color score comprises a first color score, a second color score, and a third color score, and wherein the program, when executed by the at least one processor, further causes the electronic device to:

determine the first color score based on the distances between the color sequence corresponding to the second sub-array and color sequences corresponding to remaining sub-arrays of the plurality of sub-arrays within the pattern;

determine the second color score based on a distance between the color sequence corresponding to the second sub-array and a color sequence corresponding to at least one sub-array adjacent to the second sub-array;

determine the third color score based on a number of colors comprised in each of a plurality of color categories from among colors comprised in the color sequence corresponding to the second sub-array; and determine the color score by assigning predetermined weights to the first color score, the second color score, and the third color score.

17. The electronic device of claim 10, further comprising:

a pattern image sensor configured to obtain a pattern image by capturing the projected pattern, wherein the program, when executed by the at least one processor, further causes the electronic device to:

detect peaks of pixel intensities from the pattern image;

generate, by using the peaks of the pixel intensities, a graph comprising a plurality of vertices and isotropic edges coupling one vertex from among the plurality of vertices with vertices adjacent to a vertex of the plurality of vertices;

search whether a same graph as the generated graph is comprised by a plurality of original graphs respectively corresponding to the plurality of sub-arrays comprised in an original pattern;

based on the same graph as the generated graph not being comprised by the plurality of original graphs, determine a first distance between a color sequence corresponding to the generated graph and a plurality of original color sequences corresponding to the plurality of original graphs; and recognize the color sequence corresponding to the generated graph as an original color sequence in which a second distance from the color sequence corresponding to the generated graph is minimized from among original color sequences in which a third distance from the color sequence corresponding to the generated graph is less than a second predetermined threshold.

18. A non-transitory computer readable recording medium storing one or more instructions that, when executed by a computer, cause the computer to perform a method comprising:

generating a pattern; and projecting the pattern, wherein a plurality of elements are arranged in the pattern, wherein the method further comprises selecting a color for each of the plurality of elements from a color candidate group comprising a plurality of colors with equal differences between the plurality of colors, wherein a difference between colors is calculated based on a color difference metric, wherein the color of each element of the plurality of elements is different from a color of a neighboring element adjacent to the element, wherein a plurality of color sequences corresponding to a plurality of sub-arrays are different from each other, wherein the plurality of sub-arrays comprises at least one element from among the plurality of elements, wherein distances between pairs of color sequences of the plurality of color sequences within the pattern are greater than or equal to a first predetermined threshold, wherein the pattern comprises graph information, wherein the graph information comprises a plurality of graphs respectively corresponding to the plurality of sub-arrays, and wherein each of the plurality of graphs comprises at least one vertex indicating the at least one element comprised in a corresponding sub-array and isotropic edges indicating connections between a central element of the corresponding sub-array and elements adjacent to the central element.

* * * * *